(12) United States Patent
Hayashi

(10) Patent No.: US 7,684,503 B2
(45) Date of Patent: Mar. 23, 2010

(54) OFDM RECEPTION APPARATUS AND OFDM RECEPTION METHOD

(75) Inventor: Takaya Hayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 697 days.

(21) Appl. No.: 11/579,810

(22) PCT Filed: May 9, 2005

(86) PCT No.: PCT/JP2005/008430

§ 371 (c)(1),
(2), (4) Date: Nov. 7, 2006

(87) PCT Pub. No.: WO2005/109711

PCT Pub. Date: Nov. 17, 2005

(65) Prior Publication Data

US 2008/0260052 A1    Oct. 23, 2008

(30) Foreign Application Priority Data

May 7, 2004    (JP) .............................. 2004-138194

(51) Int. Cl.
   *H04L 27/28* (2006.01)
(52) U.S. Cl. ................................. 375/260
(58) Field of Classification Search .................. 375/260, 375/316, 345, 346, 347, 349; 342/92, 392; 379/390.03; 327/306
   See application file for complete search history.

(56) References Cited

U.S. PATENT DOCUMENTS

| | | | |
|---|---|---|---|
| 5,784,410 A | | 7/1998 | Nakano |
| 5,878,089 A | * | 3/1999 | Dapper et al. ............... 375/325 |
| 6,650,878 B1 | * | 11/2003 | Abe et al. ................ 455/232.1 |
| 7,295,517 B2 | * | 11/2007 | Anim-Appiah et al. ..... 370/232 |
| 2003/0072397 A1 | * | 4/2003 | Kim et al. .................... 375/347 |

(Continued)

FOREIGN PATENT DOCUMENTS

EP    0 963 086 A    12/1999

(Continued)

OTHER PUBLICATIONS

Japanese Office Action issued in Japanese Patent Application No. 2006-513013 dated Jul. 7, 2009.

(Continued)

*Primary Examiner*—Sam K Ahn
(74) *Attorney, Agent, or Firm*—McDermott Will & Emery LLP

(57) ABSTRACT

An OFDM reception apparatus for receiving and demodulating an OFDM signal comprising a fast Fourier transform section for converting a received OFDM signal into a frequency-domain OFDM signal, a channel response calculation section for obtaining a channel response with respect to a carrier transmitting a pilot signal, from the frequency-domain OFDM signal, an interpolation section for interpolating the channel response, and outputting the result, a power calculation section for calculating the square of a magnitude of the interpolated channel response, as a carrier power, for each carrier corresponding to the channel response, an interference calculation section for calculating a degree of an influence of interference on the received OFDM signal, as an interference power, for each carrier corresponding to the interpolated channel response, and a carrier quality calculation section for calculating a ratio of the carrier power obtained to the interference power corresponding thereto, for each carrier.

11 Claims, 17 Drawing Sheets

U.S. PATENT DOCUMENTS

| | | | |
|---|---|---|---|
| 2003/0162518 A1* | 8/2003 | Baldwin et al. | 455/253.2 |
| 2004/0190637 A1* | 9/2004 | Maltsev et al. | 375/260 |
| 2004/0208138 A1 | 10/2004 | Hayashi et al. | |
| 2005/0041622 A1* | 2/2005 | Dubuc et al. | 370/332 |

FOREIGN PATENT DOCUMENTS

| | | |
|---|---|---|
| JP | 61-67324 | 4/1986 |
| JP | 8-8782 | 1/1996 |
| JP | 10-084237 | 3/1998 |
| JP | 11-346205 | 12/1999 |
| JP | 2000-183765 | 6/2000 |
| JP | 2000-224140 | 8/2000 |
| JP | 2001-102947 | 4/2001 |
| JP | 2001-177497 | 6/2001 |
| JP | 2002-118533 | 4/2002 |
| JP | 2002-158631 | 5/2002 |
| JP | 2002-335226 | 11/2002 |
| JP | 2002-368713 | 12/2002 |
| JP | 3492418 | 11/2003 |
| JP | 2003-348044 | 12/2003 |
| JP | 2003-348046 | 12/2003 |
| JP | 3531510 | 3/2004 |
| JP | 2004-134831 | 4/2004 |
| WO | WO 03/088538 A1 | 10/2003 |

OTHER PUBLICATIONS

Japanese Office Action, with English translation, issued in Japanese Patent Application No. 2006-513013, mailed Dec. 1, 2009.

* cited by examiner

FIG.3
(a)
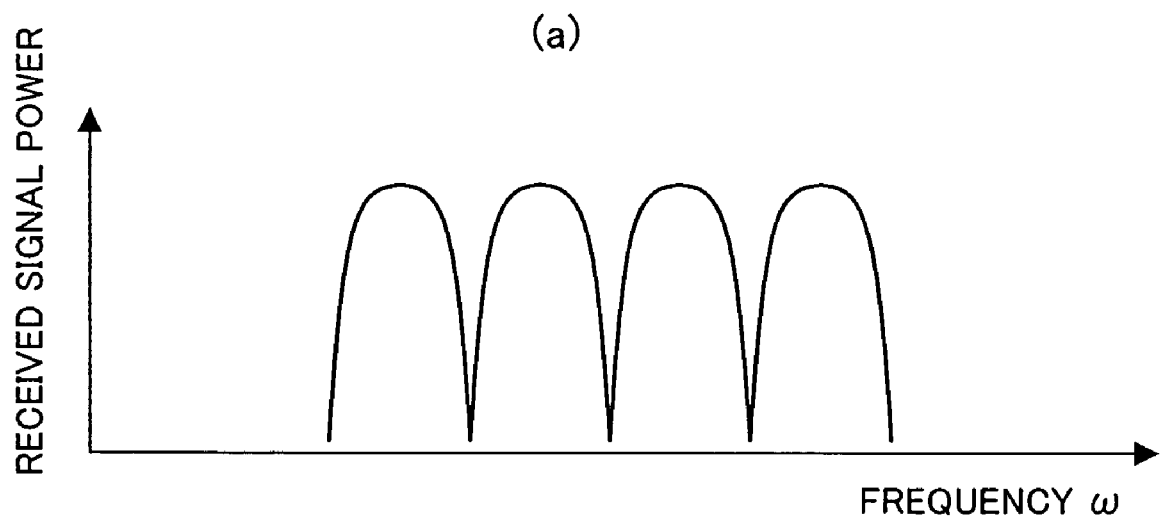
(b)
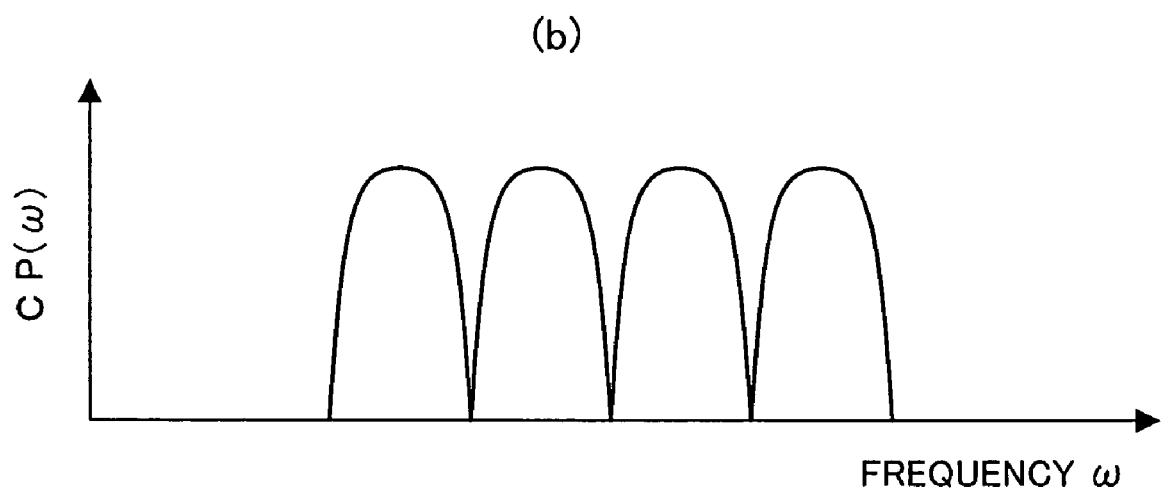

FIG.5
(a)
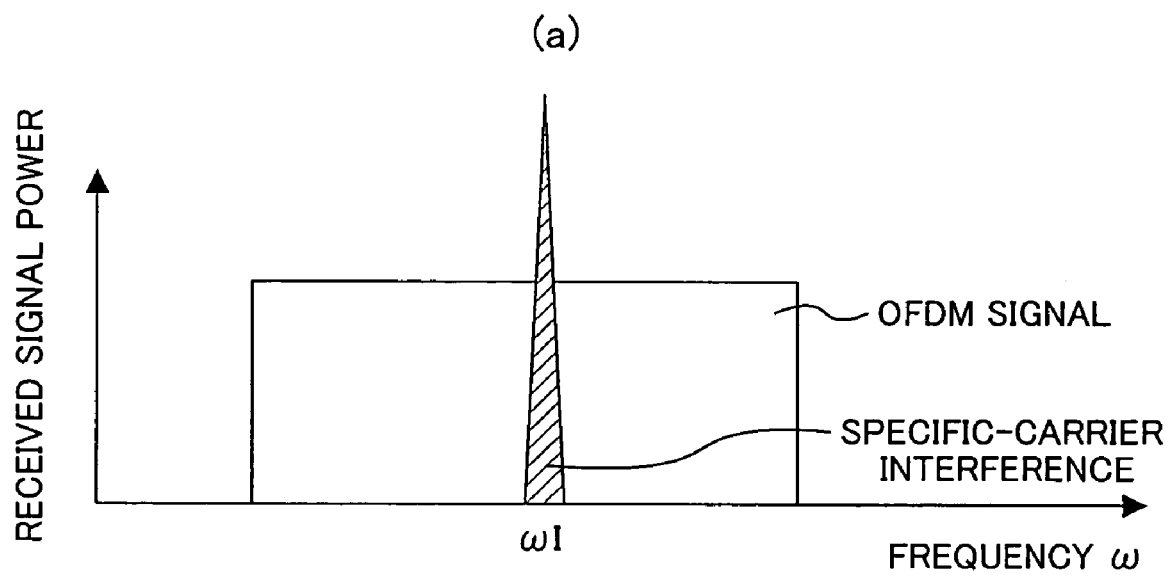
(b)
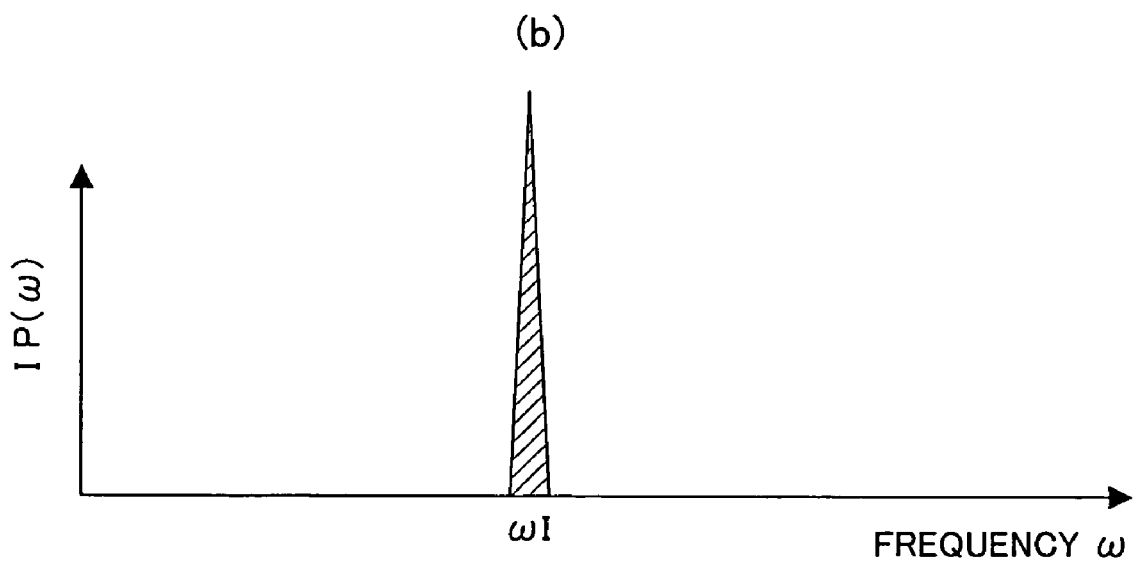

FIG.7
(a)
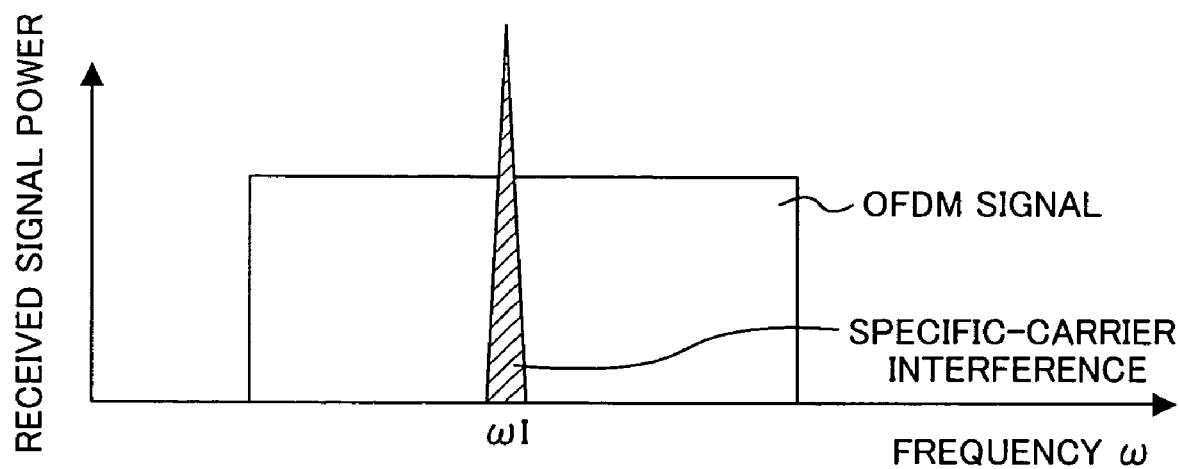
(b)
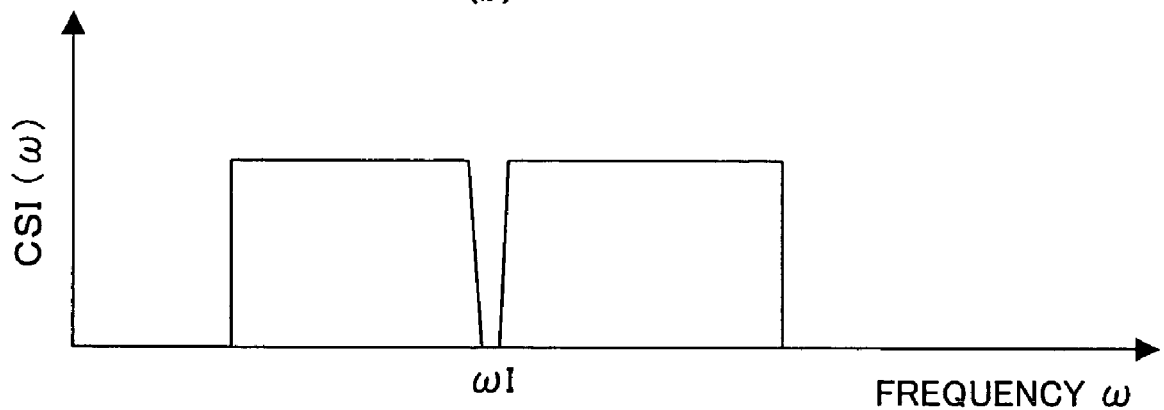

FIG.15
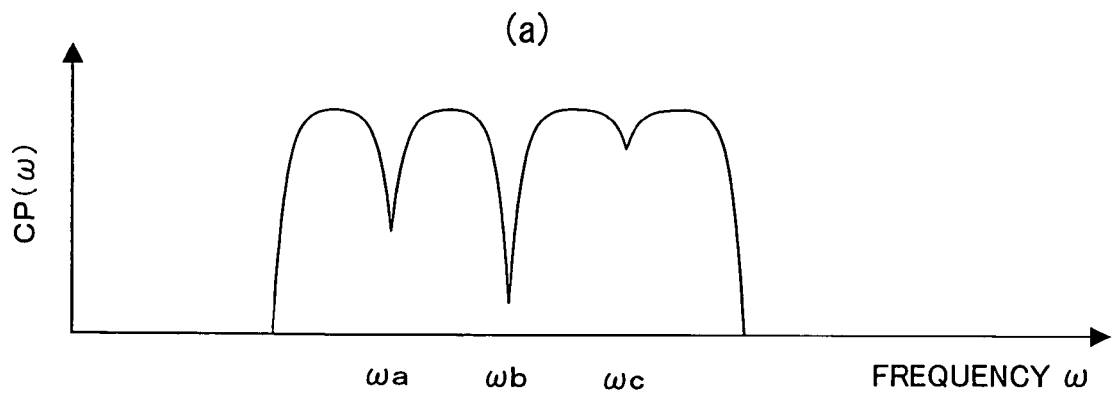
(a)
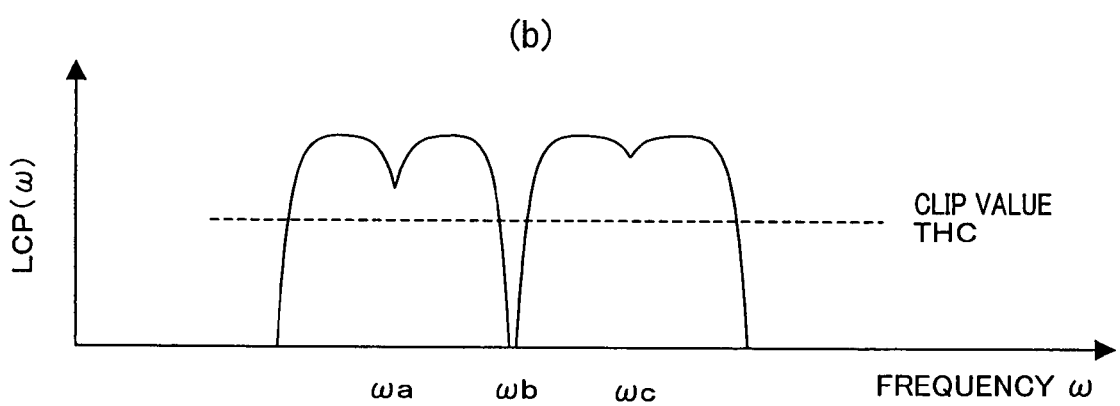
(b)
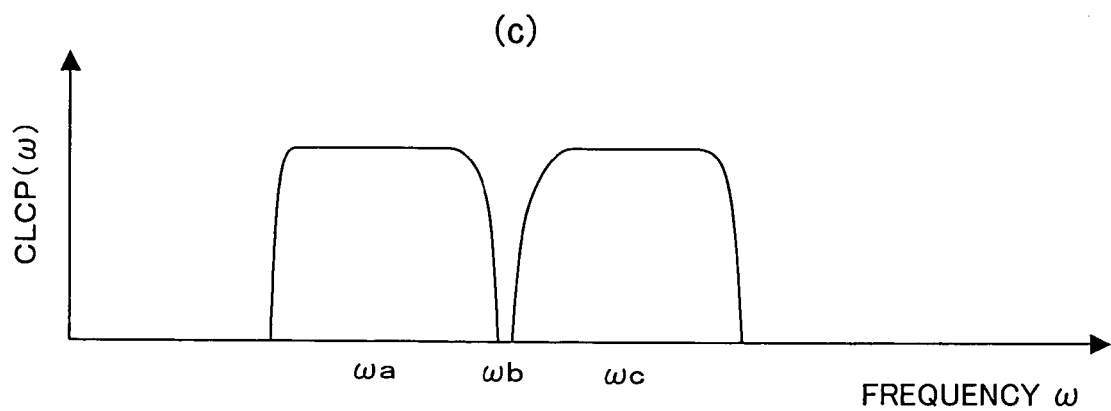
(c)

FIG.16
(a)
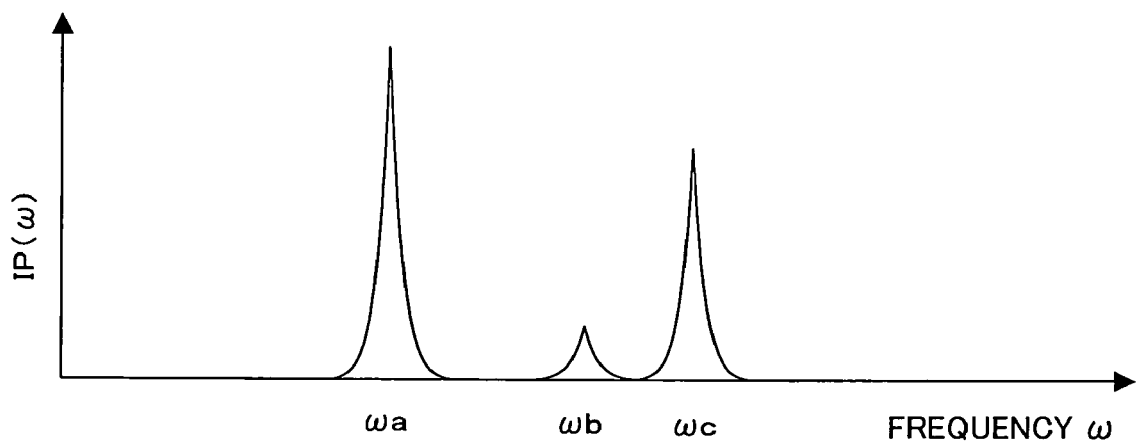
(b)
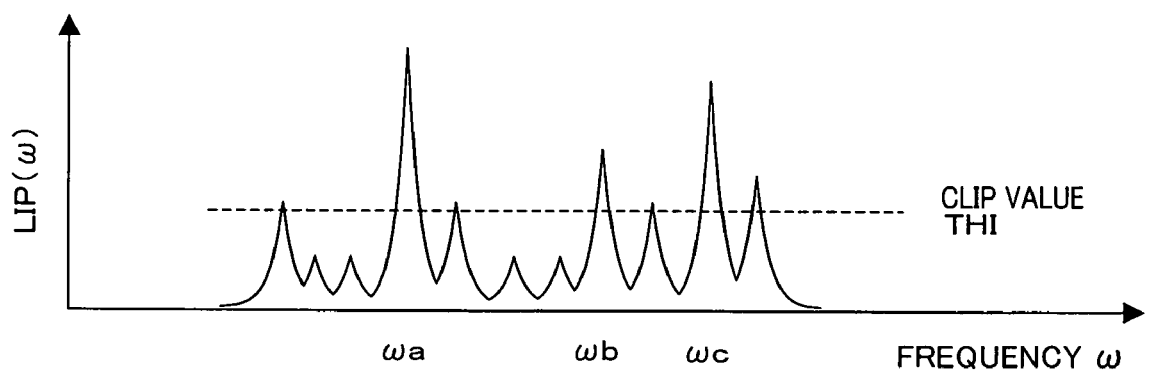
(c)
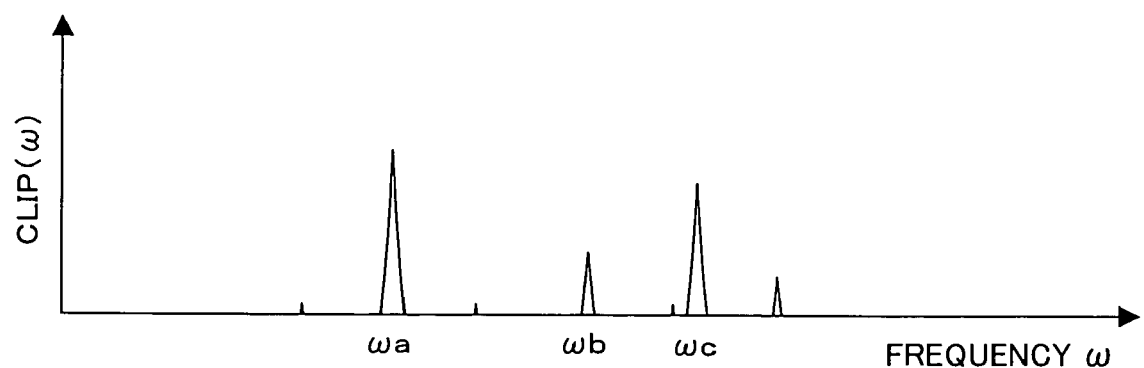

OFDM RECEPTION APPARATUS AND OFDM RECEPTION METHOD

RELATED APPLICATIONS

This application is the U.S. National Phase under 35 U.S.C. § 371 of International Application No. PCT/JP2005/008430 filed on May 9, 2005, which in turn claims the benefit of Japanese Application No. 2004-138194 filed on May 7, 2004, the disclosures of which Applications are incorporated by reference herein.

TECHNICAL FIELD

The present invention relates to an apparatus and a method for receiving a signal which is modulated using an Orthogonal Frequency Division Multiplexing (OFDM) technique and is transmitted.

BACKGROUND ART

OFDM is used as a transmission technique for digital terrestrial broadcasting in Europe and Japan, wireless LAN, and the like. The OFDM technique is a method of performing modulation/demodulation by assigning data to a plurality of carriers orthogonal to each other. An Inverse Fast Fourier Transform (IFFT) process is performed in a transmitter, while a Fast Fourier Transform (FFT) process is performed in a receiver. Any modulation method can be employed with respect to each carrier, including QPSK (Quaternary Phase Shift Keying), QAM (Quadrature Amplitude Modulation), and the like.

When an antenna for receiving radio wave of digital terrestrial broadcasting or the like is installed, a position and an orientation of the antenna may be adjusted and optimized while observing a reception state of a receiver, i.e., a signal quality value of a received signal (see Patent Document 1 below). Also, the signal quality value of a received signal may be used for a control of AGC (Automatic Gain Control) for stabilizing a gain of a received signal selected by a tuner (see Patent Document 2 below).

In these cases, it is considerably important to provide a technique of detecting the signal quality value of a received signal using a predetermined measure. An example of such a technique of detecting the signal quality value of a received signal is disclosed in Patent Document 1.

Specifically, Patent Document 1 describes that an SP (scattered pilot) signal which is inserted every three carriers is used to detect an S/N value so as to detect a signal quality value (S/N value) corresponding to the reception quality of whole received data even when there is frequency selective interference, such as multipath interference or the like. Patent Document 1 also describes a technique of applying fluctuations in channel responses in a frequency direction and a time direction to correction of the S/N value so as to reflect on the S/N value a deterioration in bit error rate due to the fluctuation of the channel response, when there is multipath interference, reception is performed during moving, or the like. Patent Document 1 also describes a technique of correcting the S/N value, depending on the number of interfered carriers so as to detect an S/N value corresponding to the reception quality of whole received data, even when specific carriers in a received signal are interfered with.

Patent Document 3 below discloses an exemplary circuit which detects a fluctuation in channel response, depending on a frequency.

Patent Document 1: JP No. 2002-158631 A
Patent Document 2: JP No. 2001-102947 A
Patent Document 3: JP No. 2002-118533 A

DISCLOSURE OF THE INVENTION

Problems to be Solved by the Invention

To reflect, on the signal quality value, a deterioration in bit error rate occurring due to various kinds of interference, such as multipath interference, a fluctuation in channel response, interference with a specific carrier and the like, an interference detecting circuit is required for each kind of interference, depending on the property of the kind of interference. This leads to an increase in circuit scale, development cost and manufacturing cost of apparatuses.

Also, to detect and reflect such kinds of interference on a signal quality value, it is necessary to correct the signal quality value, depending on the kind of interference. In other words, an adjustment technique or the like is required to perform appropriate correction with respect to each kind of interference, leading to a reduction in development efficiency of reception apparatuses.

An object of the present invention is to estimate a degree of influence of interference on an OFDM received signal, with high accuracy, even under various interference conditions.

Solution to The Problems

The present invention provides an OFDM reception apparatus for receiving and demodulating an OFDM (Orthogonal Frequency Division Multiplexing) signal composed of a plurality of carriers including a carrier transmitting a pilot signal which is inserted at predetermined symbol intervals. The apparatus comprises a fast Fourier transform section for converting a received OFDM signal into a frequency-domain OFDM signal and outputting the frequency-domain OFDM signal, a channel response calculation section for obtaining a channel response with respect to the carrier transmitting the pilot signal, from the frequency-domain OFDM signal, an interpolation section for interpolating the channel response with respect to the carrier transmitting the pilot signal, and outputting the result, a power calculation section for calculating the square of a magnitude of the interpolated channel response obtained in the interpolation section, as a carrier power, for each carrier corresponding to the channel response, an interference calculation section for calculating a degree of an influence of interference on the received OFDM signal, as an interference power, for each carrier corresponding to the interpolated channel response, and a carrier quality calculation section for calculating a ratio of the carrier power obtained in the power calculation section to the interference power corresponding thereto obtained in the interference calculation section, for each carrier.

Thereby, the degree of the influence of interference on a received OFDM signal can be obtained for each carrier with high precision.

EFFECT OF THE INVENTION

According to the present invention, the degree of the influence of interference on a received OFDM signal can be estimated even under various interference conditions while avoiding an increase in circuit scale and a reduction in development efficiency. Therefore, it is possible to correctly obtain the signal quality value of a received signal, appropriately control a gain with respect to the received signal, and improve performance of demodulation and error correction.

BRIEF DESCRIPTION OF THE DRAWINGS

FIGS. 3(a) and 3(b) are diagrams illustrating frequency characteristics of a received signal power and an obtained carrier power $CP(\omega)$, respectively, when there is multipath interference.

FIGS. 5(a) and 5(b) are diagrams illustrating frequency characteristics of a received signal power and an interference power $IP(\omega)$, respectively, when there is interference with a specific carrier in the vicinity of a frequency $\omega I$.

FIGS. 7(a) and 7(b) are diagram illustrating a received signal power and a carrier quality value $CSI(\omega)$, respectively, when there is frequency selective interference with a specific carrier in the vicinity of a frequency $\omega I$.

FIGS. 15(a), 15(b) and 15(c) are diagrams illustrating frequency characteristics of carrier powers $CP(\omega)$ and $LCP(\omega)$ and clipped carrier power $CLCP(\omega)$, respectively, when there is multipath interference.

FIGS. 16(a), 16(b) and 16(c) are diagrams illustrating frequency characteristics of interference powers $IP(\omega)$ and $LIP(\omega)$ and clipped interference power $CLIP(\omega)$, respectively, when there is analog co-channel interference.

Figure 1:
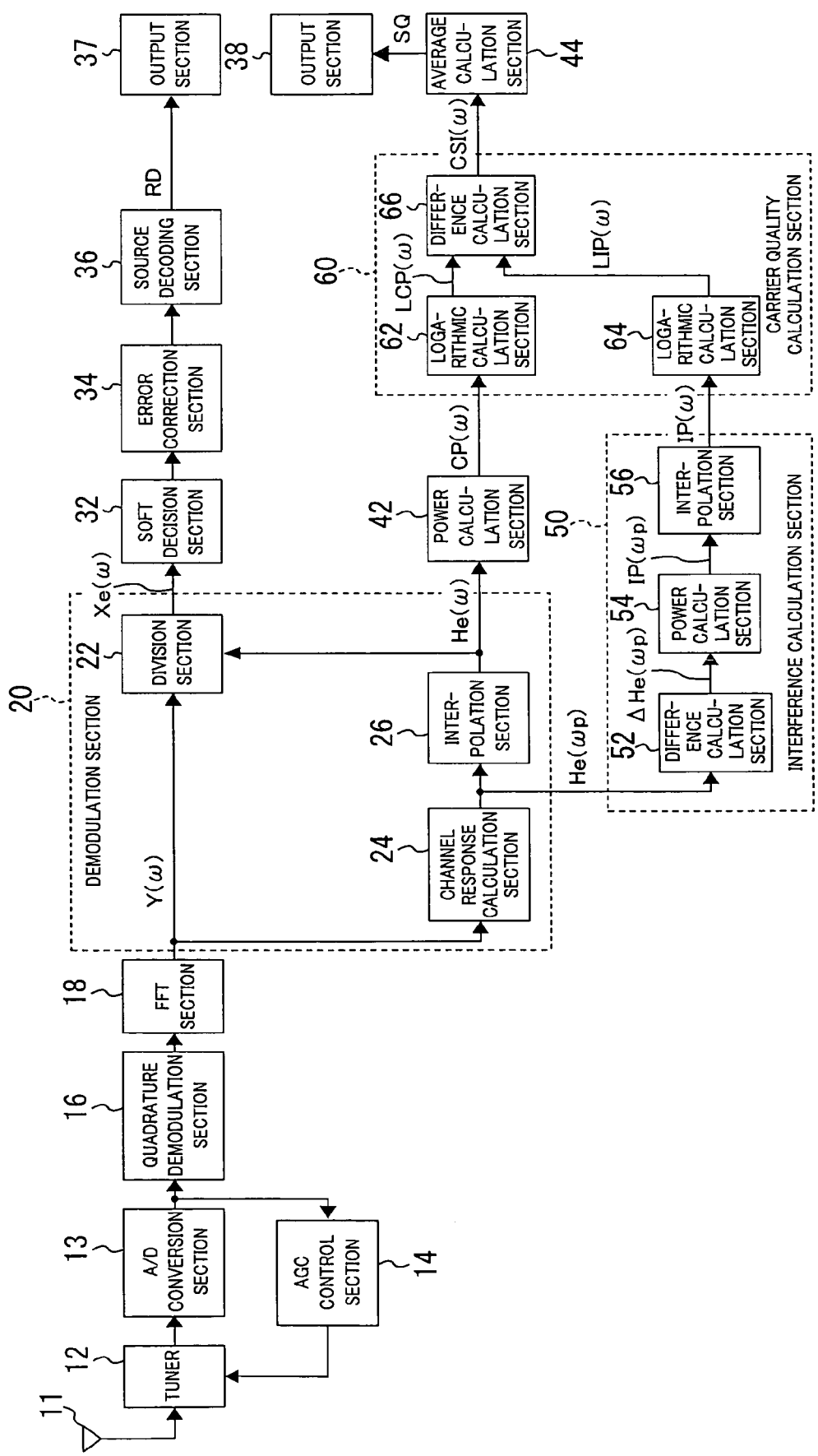
FIG. 1 is a block diagram illustrating an exemplary configuration of an OFDM reception apparatus according to a first embodiment of the present invention.

DESCRIPTION OF THE REFERENCE CHARACTERS 14, 214 AGC control section (gain control section)
18 FFT section (fast Fourier transform section)
20 demodulation section
24 channel response calculation section
26 interpolation section
32, 532, 632 soft decision section
42 power calculation section
44 average calculation section
50, 150, 650 interference calculation section
60, 560, 660 carrier quality calculation section
70, 270, 370, 470 noise power calculation section
80, 380 noise power candidate calculation section Best Mode For Carrying Out The Invention Hereinafter, embodiments of the present invention will be described with reference to the accompanying drawings.

First Embodiment

FIG. 1 is a block diagram illustrating an exemplary configuration of an OFDM reception apparatus according to a first embodiment of the present invention. The OFDM reception apparatus of FIG. 1 comprises a tuner 12, an A/D conversion section 13, an AGC control section 14 (gain control section), a quadrature demodulation section 16, an FFT section (fast Fourier transform section) 18, a demodulation section 20, a soft decision section 32, an error correction section 34, a source decoding section 36, output sections 37 and 38, a power calculation section 42, an average calculation section 44, an interference calculation section 50, and a carrier quality calculation section 60.

An operation of the OFDM reception apparatus of FIG. 1 will be described. An antenna 11 receives an RF (radio frequency) OFDM signal and outputs the OFDM signal to the tuner 12. The tuner 12 selects a desired RF OFDM signal from the RF OFDM signal received from the antenna 11 while performing a gain control based on an AGC control signal from the AGC control section 14, frequency-converts the selected OFDM signal into an IF (intermediate frequency) OFDM signal, and outputs the IF OFDM signal to the A/D conversion section 13.

The A/D conversion section 13 samples and converts the IF OFDM signal (analog signal) into a digitized IF OFDM signal, and outputs the digitized IF OFDM signal to the AGC control section 14 and the quadrature demodulation section 16. The AGC control section 14 generates an AGC control signal based on an average level of an input signal so that an amplitude of the input signal goes to a predetermined level, and outputs the AGC control signal to the tuner 12.

The quadrature demodulation section 16 converts the digitized IF OFDM signal into a baseband OFDM signal, and outputs the baseband OFDM signal to the FFT section 18. The FFT section 18 performs Fourier transform with respect to the baseband OFDM signal. Specifically, the time-domain OFDM signal is converted into a frequency-domain OFDM signal $Y(\omega)$, which is in turn output to the demodulation section 20. Here, $\omega$ is an integer indicating an index of a carrier constituting the frequency-domain OFDM signal. The output of the FFT section 18 indicates a phase and an amplitude of each carrier of the OFDM signal, and specifically, is represented in the form of a complex signal (vector) having an i-axis component and a q-axis component independently.

Figure 2:
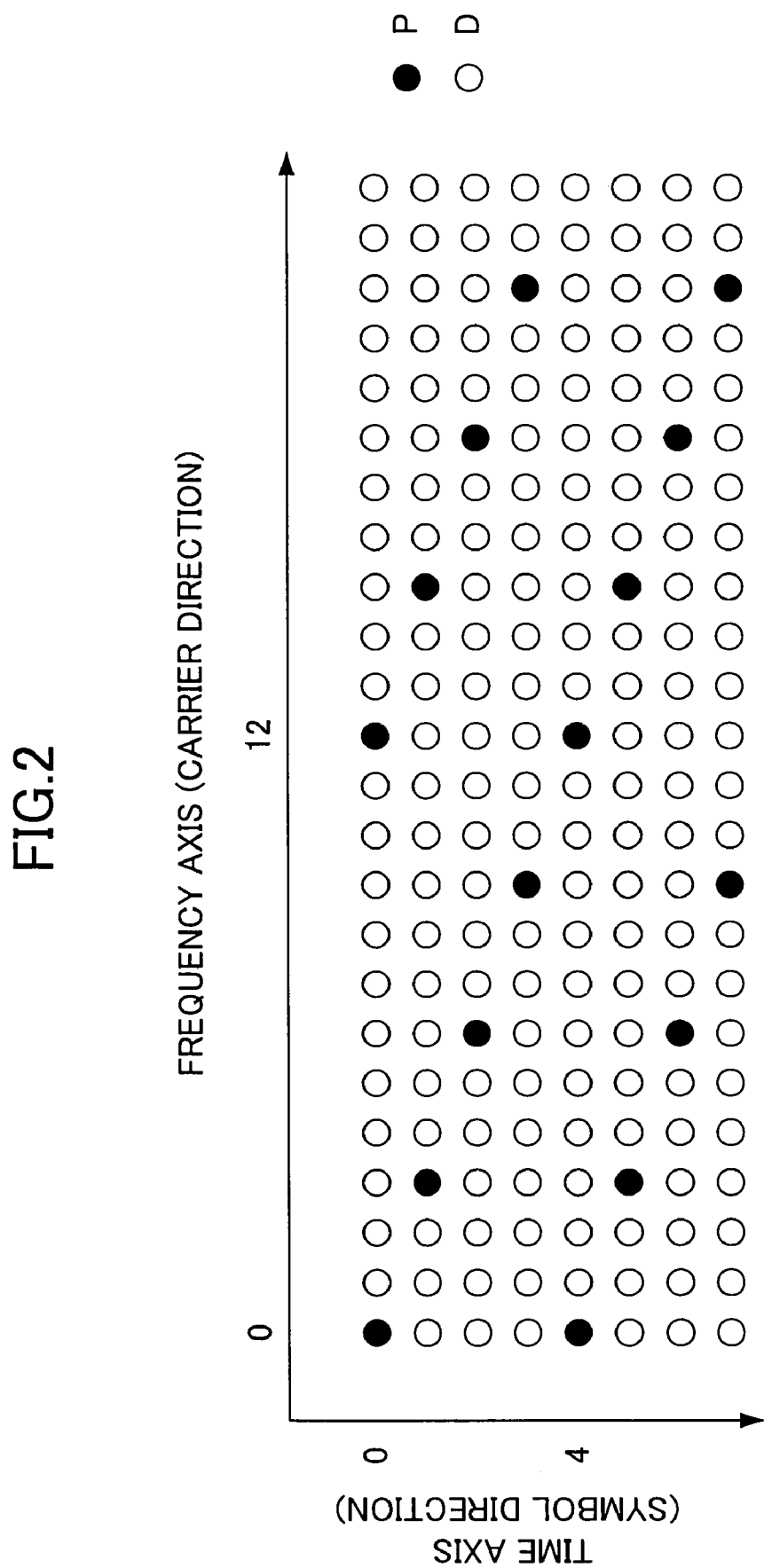
FIG. 2 is a diagram illustrating an exemplary transmission format about a carrier arrangement of a frequency-domain OFDM signal $Y(\omega)$.

FIG. 2 is a diagram illustrating an exemplary transmission format about a carrier arrangement of the frequency-domain OFDM signal $Y(\omega)$. FIG. 2 illustrates, as an example, a portion of the digital terrestrial television broadcasting standards in Japan. In FIG. 2, an open circle D indicates a position of a data signal which transmits information, such as video, audio or the like, and a closed circle P indicates a position of a pilot signal. The pilot signal is also called an SP signal, and is equally spaced and inserted at a rate of one symbol every four symbols in one carrier every three carriers. The amplitude, phase and insertion position of the pilot signal are already known to the receiver.

The demodulation section 20 estimates frequency characteristics of a transmission channel on which the received OFDM signal has been transmitted (hereinafter referred to as a channel response). Specifically, the demodulation section 20 calculates channel responses $He(\omega)$ with respect to all carriers, and based on the estimated channel responses $He(\omega)$, performs waveform equalization with respect to the frequency-domain OFDM signal $Y(\omega)$ to obtain a demodulated signal $Xe(\omega)$, and outputs the demodulated signal $Xe(\omega)$ to the soft decision section 32.

When an index of a carrier transmitting a pilot signal (hereinafter referred to as a pilot carrier) is represented by $\omega p$, the demodulation section 20 calculates channel responses $He(\omega p)$ of pilot carriers from the frequency-domain OFDM signal $Y(\omega)$ and outputs the channel responses $He(\omega p)$ to the interference calculation section 50, and also calculates channel responses $He(\omega)$ of all carriers and outputs the channel responses $He(\omega)$ to the power calculation section 42.

The soft decision section 32 performs soft decision with respect to the input demodulated signal $Xe(\omega)$ for each carrier to calculate soft decision metric data, and outputs the soft decision metric data to the error correction section 34. The soft decision metric data indicates the probability of data ("0" or "1") transmitted by each carrier, i.e., the degree of "zeroness" or "oneness".

The error correction section 34 performs a decoding process with respect to the soft decision metric data by soft decision Viterbi decoding and Reed-Solomon decoding to correct an error which occurred on a transmission channel, reproduces a transmitted TS (Transport Stream), and outputs the reproduced TS to the source decoding section 36.

The source decoding section 36 separates video, audio, or other data from the reproduced TS, and optionally performs an information decoding process (e.g., when video is compressed by MPEG, etc.), to obtain the transmitted video, audio or other data, and outputs the data as received data RD to the output section 37. The output section 37 has a monitor and a loudspeaker, for example. The output section 37 displays the video on the monitor and outputs the audio from the loudspeaker based on the received data RD.

The power calculation section 42 obtains the square of a magnitude of the channel response $He(\omega)$ for each carrier, and outputs the result as a carrier power $CP(\omega)$ to the carrier quality calculation section 60.

The interference calculation section 50 receives the channel response $He(\omega p)$ of the pilot carrier, and estimates and calculates, for each carrier, the degree of an influence of various kinds of interference, such as Gaussian noise (hereinafter simply referred to as "noise") interference, frequency selective interference (co-channel interference due to analog broadcasting, etc.), and the like, which is superposed on the received OFDM signal. The interference calculation section 50 outputs the calculation result as an interference power $IP(\omega)$ to the carrier quality calculation section 60.

The carrier quality calculation section 60 calculates a ratio $CP(\omega)/IP(\omega)$ of the carrier power $CP(\omega)$ to the interference power $IP(\omega)$ corresponding thereto, for each carrier, and outputs the calculation result as a carrier quality value $CSI(\omega)$ to the average calculation section 44. The carrier quality value $CSI(\omega)$ represents a quality value of each carrier of the OFDM signal, and when the interference is noise, a ratio of a carrier wave power to a noise power of each carrier (so-called C/N).

The average calculation section 44 averages the carrier quality value $CSI(\omega)$ of each input carrier in a frequency-axis direction (carrier direction) or both in the frequency-axis direction and a time-axis direction (symbol direction), and outputs the calculated average value, as a received signal quality value SQ indicating the quality of the received signal, to the output section 38. The received signal quality value SQ is a value corresponding to the degree of an influence of interference. The output section 38 has a monitor and displays the received signal quality value SQ on the monitor.

An operation of a major portion of the OFDM reception apparatus of FIG. 1 thus configured will be described in greater detail.

The demodulation section 20 of FIG. 1 has a division section 22, a channel response calculation section 24, and an interpolation section 26. The channel response calculation section 24 receives the frequency-domain OFDM signal $Y(\omega)$ input from the FFT section 18, performs division using a known pilot signal (SP signal) to calculate a channel response $He(\omega p)$ with respect to each pilot carrier, and outputs the channel response $He(\omega p)$ to the interpolation section 26. The channel responses $He(\omega p)$ are obtained at the positions of the closed circles P in FIG. 2, i.e., every four symbols in a pilot carrier inserted every three carriers.

The interpolation section 26 receives the channel responses $He(\omega p)$ obtained by the channel response calculation section 24, performs interpolation with respect to the channel responses $He(\omega p)$ in the time-axis direction (symbol direction) and the frequency-axis direction (carrier direction) to calculate channel responses $He(\omega)$ of all carriers, and outputs the channel responses $He(\omega)$ to the division section 22 and the power calculation section 42. The interpolated channel responses $He(\omega)$ are obtained at the positions of the open circles D and the closed circle P of FIG. 2 for each carrier.

Note that, when the channel responses $He(\omega p)$ are interpolated on the time axis, a memory is generally used. When first-order interpolation (linear interpolation) is used for the time-axis interpolation, an integration process or the like which is performed with respect to the channel responses $He(\omega p)$ in the symbol direction over a long time is no longer required. Therefore, even in the case where a fluctuation over time in channel response is relatively large (e.g., when reception is performed during moving, etc.), the channel responses $He(\omega)$ of all the carriers can be obtained with high estimation precision.

The division section 22 divides, for each carrier, the frequency-domain OFDM signal $Y(\omega)$ output from the FFT section 18 by the channel responses $He(\omega)$ of all the carriers output from the interpolation section 26, to perform waveform equalization (demodulation), and outputs the resultant demodulated signal $Xe(\omega)$ to the soft decision section 32.

The power calculation section 42 receives the channel responses $He(\omega)$ of all the carriers, obtains the sum of the squares of an i-axis component and a q-axis component of the channel response $He(\omega)$ (complex vector), i.e., the square of the magnitude of the channel response $He(\omega)$, and outputs the result as the carrier power $CP(\omega)$ of the OFDM signal to the carrier quality calculation section 60. The power calculation section 42 obtains the carrier power CP(ω) corresponding to the channel response He(ω) for each carrier. The carrier power CP(ω) represents frequency characteristics of a power of a received signal for each symbol.

FIGS. 3(*a*) and 3(*b*) are diagrams illustrating frequency characteristics of the received signal power and the obtained carrier power CP(ω), respectively, when there is multipath interference. In general, in the case of a transmission channel on which there is multipath interference or the like, a primary wave and a delayed wave cancel each other, depending on the phases thereof, so that there is a carrier in which the power of a received signal is significantly reduced, depending on a ratio of the powers of both the waves. In such a case, as illustrated in FIG. 3(*b*), the carrier power CP(ω) indicates a reduction in the power of the received signal, i.e., the carrier power of the OFDM signal, depending on the frequency.

It is now assumed that a pilot signal on a transmitter side of a certain pilot carrier (carrier index is ωp) with respect to a certain symbol (symbol index is s) is represented by X(ωp, s). The transmitted signal is received as a signal Y(ωp, s) represented by:

$$Y(\omega p, s) = H(\omega p, s)X(\omega p, s) + I(\omega p, s) \quad (1)$$

where H(ωp, s) indicates a channel response acting on a pilot carrier having a carrier index ωp, I(ωp, s) indicates an interference, such as noise superposed on the pilot carrier or the like, which does not have a correlation with the OFDM signal, and H(ωp, s) and I(ωp, s) are each represented in the form of a complex signal (vector).

In this case, the channel response He(ωp, s) with respect to the pilot carrier of the carrier index ωp is obtained by:

$$He(\omega p, s) = Y(\omega p, s) / X(\omega p, s) \quad (2)$$
$$= H(\omega p, s) + I'(\omega p, s)$$

where  (3)
$$I'(\omega p, s) = I(\omega p, s) / X(\omega p, s).$$

Similarly, a channel response He(ωp, s+4) with respect to a pilot carrier of a symbol index s+4 after an interval in which a pilot signal is inserted, i.e., a passage of 4 symbols, are represented by:

$$He(\omega p, s+4) = Y(\omega p, s+4) / X(\omega p, s+4) \quad (4)$$
$$= H(\omega p, s+4) + I'(\omega p, s+4)$$
$$(I'(\omega p, s+4) = I(\omega p, s+4) / X(\omega p, s+4)).$$

Next, ΔHe(ωp, s) is obtained as a four-symbol difference in channel response, i.e., a difference between He(ωp, s) and He(ωp, s+4), by:

$$\Delta He(\omega\ p, s) = He(\omega p, s+4) - He(\omega p, s) \quad (5)$$
$$= H(\omega p, s+4) + I'(\omega p, s+4) -$$
$$\{H(\omega p, s) + I'(\omega p, s)\}.$$

In expression (5), if a fluctuation over time between the channel responses H (ωp, s+4) and H(ωp, s) is negligible, ΔHe(ωp, s) is calculated by:

$$\Delta He(\omega p, s) = I'(\omega p, s+4) - I'(\omega p, s) \quad (6)$$
$$= \{I(\omega p, s+4) - I(\omega p, s)\} / X(\omega p, s).$$

In this case, since X(ωp, s) is a constant value, a linear sum of interference vectors with respect to a pilot carrier is obtained as the differential vector ΔHe(ωp, s).

Therefore, it is found that the magnitude of the four-symbol differential vector ΔHe(ωp, s) between the channel responses of a pilot carrier, has a high correlation with the magnitude of an interference vector which does not have a correlation with the OFDM signal, i.e., the degree of an influence of interference. Also, when a fluctuation over time in the channel response is relatively large (e.g., when reception is performed during moving, etc.), the differential vector ΔHe(ωp, s) is large, depending on the magnitude of the fluctuation, as can be seen from expression (5). Therefore, it is found that the degree of an influence of interference, a fluctuation over time in channel response, or the like can be detected from the magnitude of the differential vector ΔHe (ωp, s), for each carrier.

The interference calculation section 50 of FIG. 1 will be described. The interference calculation section 50 has a difference calculation section 52, a power calculation section 54, and an interpolation section 56. The difference calculation section 52 receives the channel responses He(ωp) with respect to a pilot carrier obtained by the channel response calculation section 24, and calculates a differential value ΔHe(ωp) between a latest channel response and a channel response one cycle (4 symbols) before on the time axis with respect to the same pilot carrier, and outputs the differential value ΔHe(ωp) to the power calculation section 54. Note that the difference calculation section 52 may share a memory which the interpolation section 26 of the demodulation section 20 uses for the time-axis direction interpolation, and the channel response with respect to a pilot carrier four symbols before may be obtained from the memory.

The power calculation section 54 obtains the sum of the squares of the i-axis component and the q-axis component of ΔHe(ωp) (complex vector) obtained by the difference calculation section 52, and outputs the sum, as an interference power IP(ωp) with respect to a pilot carrier, to the interpolation section 56. The interference power IP(ωp) is obtained with respect to the position of the closed circles P in FIG. 2.

The interpolation section 56 receives the interference power IP(ωp), interpolates the interference power IP(ωp) in the time-axis direction (symbol direction) and thereafter also in the frequency-axis direction (carrier direction), and outputs the result as an interference power IP(ω). The interference power IP(ω) is a value which is obtained by converting the degree of an influence of interference on an OFDM signal into a power, and is obtained for each carrier corresponding to the interpolated channel response He(ω) obtained by the interpolation section 26.

Note that, when the interference power IP(ωp) is interpolated in the time-axis direction, the interference power IP(ωp) may be integrated in the time-axis direction for each pilot carrier, and the resultant integral value may be used. In this case, since the number of carriers into which a pilot signal is inserted is ⅓ of the number of carriers in the whole band, a memory corresponding to ⅓ of the symbols is used for the time-axis direction interpolation.

Note that, when the interference power IP(ωp) is interpolated in the time-axis direction and thereafter also in the frequency-axis direction, first-order interpolation may be employed.

FIGS. 4(a) and 4(b) are diagrams illustrating frequency characteristics of a received signal power and an interference power IP(ω) when Gaussian noise is superposed on an OFDM signal on a transmission channel. An average power of noise power superposed per carrier of an OFDM signal is represented by Nd.

In the case where the four-symbol difference in channel response He(ωp) is obtained as described above, if a fluctuation over time in channel response is negligible, a linear sum of noise vectors is obtained as the differential vector ΔHe(ωp). The noise vector linear sum has a power about two times larger than the superposed noise power on the transmission channel. Therefore, the average value of the interference power IP(ω) per carrier of an OFDM signal obtained by the interference calculation section 50 is about 2 Nd as indicated in FIG. 4(b). In other words, if correction is performed by multiplying a value of the interference power IP(ω) by ½, an approximate noise power can be appropriately detected.

In the transmission channel, the case where frequency selective interference, such as co-channel interference due to an analog signal or the like, which has an influence on a specific carrier is superposed on an OFDM signal will be discussed. FIGS. 5(a) and 5(b) are diagrams illustrating frequency characteristics of a received signal power and an interference power IP(ω), respectively, when there is interference with a specific carrier in the vicinity of a frequency ωI.

Figure 4:
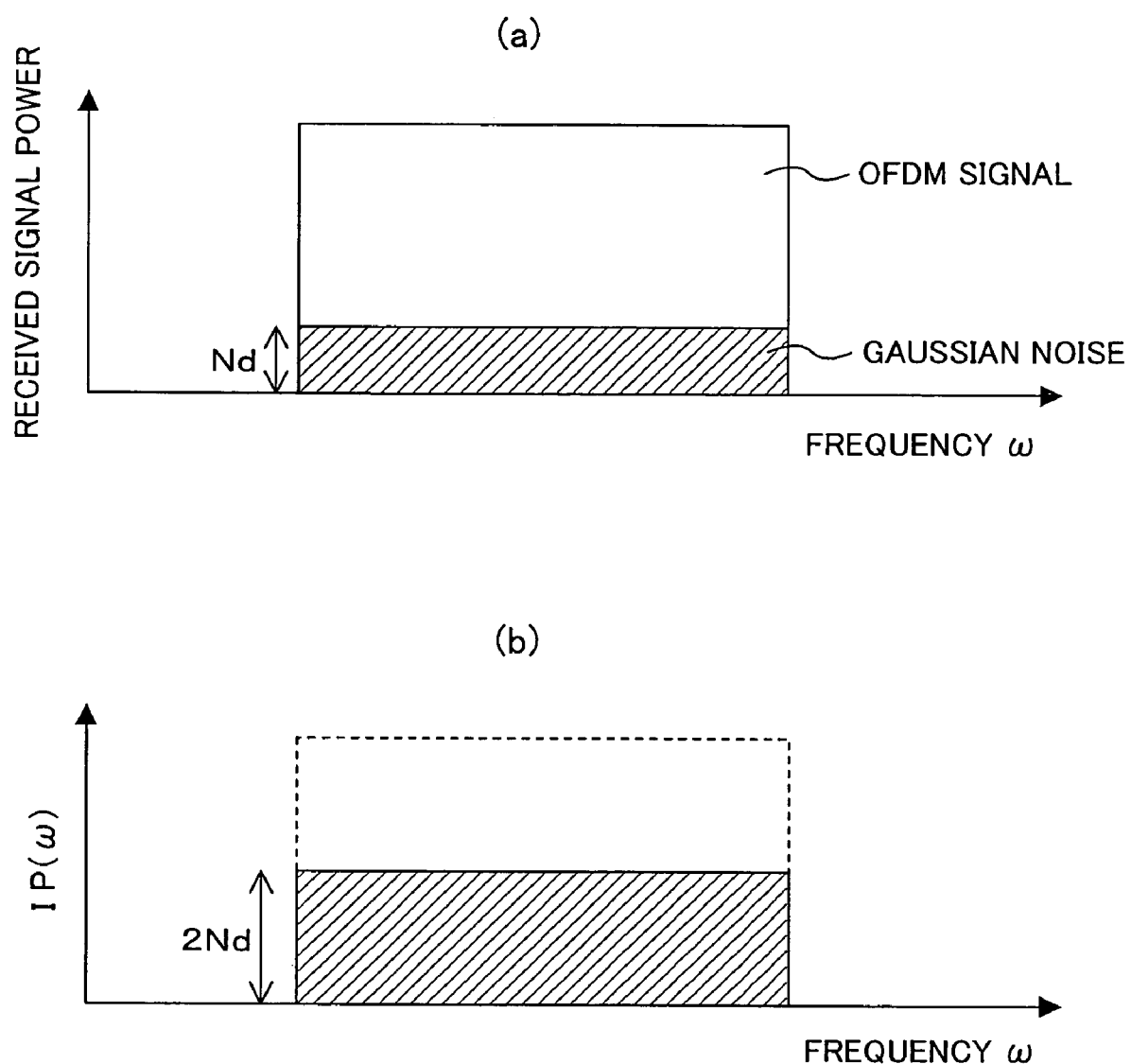
FIGS. 4(a) and 4(b) are diagrams illustrating frequency characteristics of a received signal power and an interference power $IP(\omega)$ when Gaussian noise is superposed on an OFDM signal on a transmission channel.

Also in this case, since the specific carrier interference is a signal which does not have a correlation with the OFDM signal, an influence degree corresponding to a strength of the interference is converted into a power as in the case of FIG. 4, and the frequency position of the interference is appropriately detected as indicated in FIG. 5(b).

In the case where channel responses fluctuate over time (e.g., when reception is performed during moving, etc.), a four-symbol difference in channel response He(ωp) is obtained, i.e., a differential vector ΔHe(ωp) corresponding to a fluctuation amount over time in channel response is obtained. Therefore, the value of the interference power IP(ω) per carrier of the OFDM signal, which is obtained by the interference calculation section 50, indicates the degree of an influence of the fluctuation over time in channel response on a received signal.

The carrier quality calculation section 60 of FIG. 1 has logarithmic calculation sections 62 and 64, and a difference calculation section 66. The logarithmic calculation sections 62 and 64 calculate logarithmic values LCP(ω) and LIP(ω) of the carrier power CP(ω) and the interference power IP(ω), respectively, and outputs the logarithmic values LCP(ω) and LIP(ω) to the difference calculation section 66. The difference calculation section 66 obtains a differential value between the output LCP(ω) of the logarithmic calculation section 62 and the output LIP(ω) of the logarithmic calculation section 64, and outputs the calculation result as a carrier quality value CSI(ω) to the average calculation section 44. Although such an operation of obtaining the logarithmic value difference corresponds to calculation of a ratio of the carrier power CP(ω) to the interference power IP(ω), a divider is not required as compared to the case where division is directly performed between the carrier power CP(ω) and the interference power IP(ω), thereby making it possible to reduce the circuit scale.

Note that, when the carrier quality value CSI(ω) is calculated, a value obtained by dividing the carrier power CP(ω) by the interference power IP(ω) may be obtained as the carrier quality value CSI(ω) without conversion into a logarithm. In this case, a divider is required.

Here, an exemplary value of the carrier quality value CSI(ω) under various interference environments will be described. The carrier quality value CSI(ω) is assumed to be obtained from a difference between the logarithmic values of the carrier power CP(ω) and the interference power IP(ω).

Figure 6:
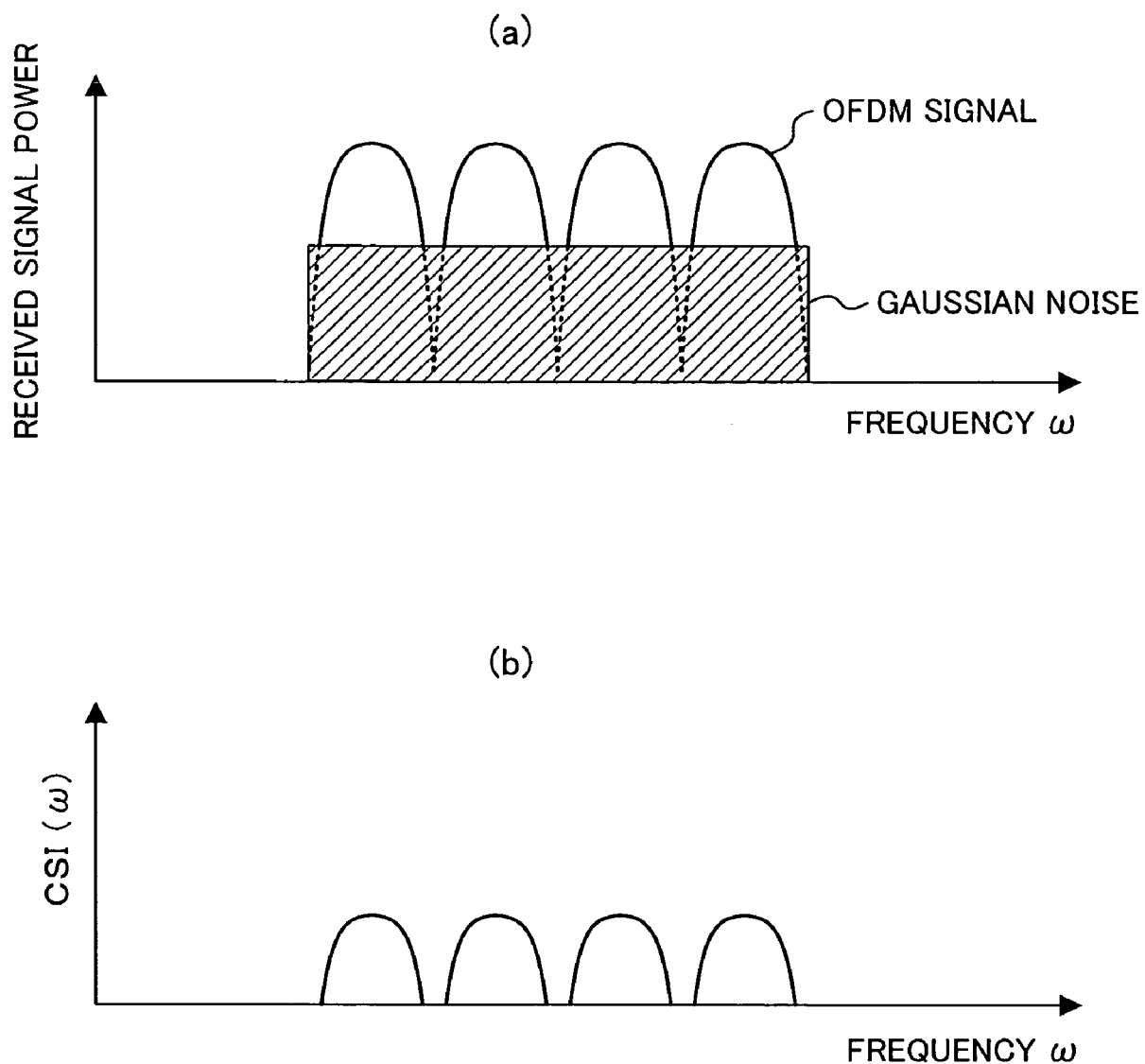
FIGS. 6(a) and 6(b) are diagrams illustrating a received signal power and a carrier quality value $CSI(\omega)$ of each carrier of an OFDM signal when both multipath interference and noise interference are simultaneously present in a received signal.

FIGS. 6(a) and 6(b) are diagrams illustrating a received signal power and a carrier quality value CSI(ω) of each carrier of an OFDM signal when both multipath interference and noise interference are simultaneously present in a received signal. Since a noise power is superposed on each carrier as illustrated in FIG. 6(a), the carrier quality value CSI(ω) of a carrier having a small received signal power is considerably small as illustrated in FIG. 6(b).

FIGS. 7(a) and 7(b) are diagram illustrating a received signal power and a carrier quality value CSI(ω), respectively, when there is frequency selective interference with a specific carrier in the vicinity of the frequency ωI. As illustrated in FIG. 7(b), the carrier quality value CSI(ω) of an interfered carrier decreases.

When channel responses fluctuate over time (e.g., when reception is performed during moving, etc.), the value of the carrier power CP(ω) obtained by the power calculation section 42 fluctuates for each symbol along with the fluctuation in channel response. Therefore, the carrier quality value CSI(ω) for each carrier at each time (each symbol) can be appropriately calculated, depending on the power of a received signal.

Note that the carrier quality calculation section 60 obtains, as the carrier quality value CSI(ω), either CP(ω)/IP(ω) or IP(ω)/CP(ω). There is no essential difference between these cases.

The interpolation section 56 of the interference calculation section 50 does not need to perform the frequency-axis direction interpolation. In this case, the interpolation section 26 of the demodulation section 20 omits the frequency-axis direction interpolation when calculating a channel response for calculating the carrier power CP(ω).

Figure 8:
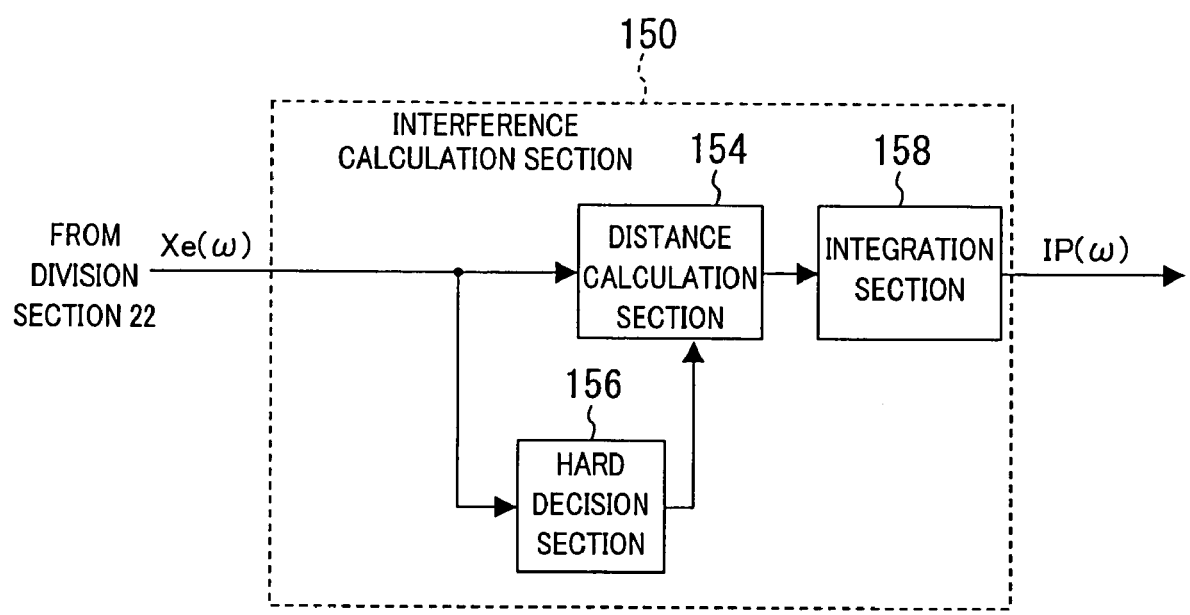
FIG. 8 is a block diagram illustrating a configuration of a variation of a interference calculation section of FIG. 1.

FIG. 8 is a block diagram illustrating a configuration of a variation of the interference calculation section 50 of FIG. 1. The interference calculation section 150 of FIG. 8 comprises a distance detection section 154, a hard decision section 156, and an integration section 158. The interference calculation section 150 of FIG. 8 is used instead of the interference calculation section 50 in the OFDM reception apparatus of FIG. 1.

The hard decision section 156 performs hard decision which decides a transmission signal point which is closest to a signal point on the i-q plane, for each carrier of the demodulated signal Xe(ω) output from the division section 22, and outputs the decision result as a reference signal point to the distance calculation section 154. The distance calculation section 154 obtains, as a differential value, the square of a distance on the i-q plane between a signal point of each carrier of the demodulated signal Xe(ω) output from the division section 22, and a reference signal point output from the hard decision section 156 corresponding thereto, and outputs the differential value to the integration section 158. The integration section 158 averages the differential value for each carrier in the time-axis direction, and outputs the resultant value (the variance value of the demodulated signal Xe(ω) as an interference power IP(ω) to the logarithmic calculation section 64.

As described above, the interference calculation section 150 of FIG. 8 can also calculate, for each carrier, a value corresponding to the degree of an influence of various kinds of interference, such as noise interference occurring on a transmission channel and frequency selective interference (e.g., co-channel interference due to analog broadcasting, etc.), and the like.

Note that a method of calculating an interference power in the interference calculation section is not limited to the above-described method, and may be any method which can calculate the interference power $IP(\omega)$ as the degree of an influence of interference for each carrier.

As described above, the OFDM reception apparatus of this embodiment calculates the carrier power $CP(\omega)$ based on the channel response $He(\omega)$ estimated from a pilot carrier, thereby making it possible to easily estimate a power of each carrier even under conditions of a transmission channel varying over time.

The quality of each carrier is obtained as the carrier quality value $CSI(\omega)$ from the interference power $IP(\omega)$ and the carrier power $CP(\omega)$ of each carrier, and the average values on the frequency axis and the time axis of the carrier quality value $CSI(\omega)$ obtained for each carrier is assumed as the received signal quality value SQ of a received signal. Therefore, under various interference conditions, such as noise interference, mutipath, frequency selective interference with a specific carrier, a fluctuation in channel response occurring during moving, and the like, an influence thereof on a received signal can be estimated with high precision using a simple circuit configuration without correction with respect to each cause, and the received signal quality value SQ of a received signal on which the influence is reflected can be detected.

By using the received signal quality value SQ thus obtained, for example, when an antenna is installed, the direction and position of an antenna can be appropriately set.

Second Embodiment

When an OFDM signal is received and demodulated, an amount of noise superposed on the received signal may be detected and utilized in a control of a gain of an output signal of a tuner. In this embodiment, an OFDM reception apparatus will be described in which a power value of noise superposed on a received signal is detected.

Figure 9:
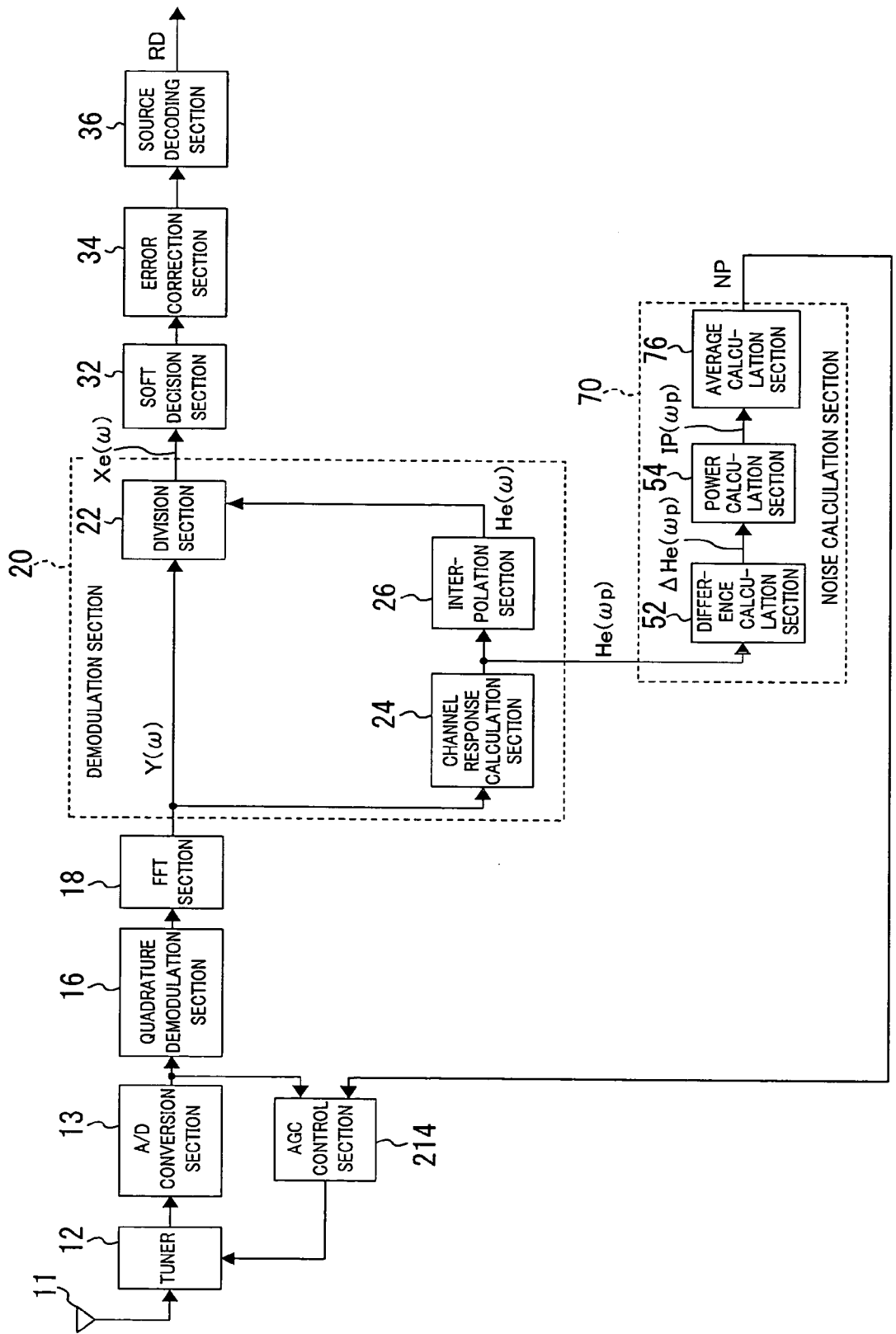
FIG. 9 is a block diagram illustrating a configuration of an OFDM reception apparatus according to a second embodiment of the present invention.

FIG. 9 is a block diagram illustrating a configuration of an OFDM reception apparatus according to a second embodiment of the present invention. The OFDM reception apparatus detects a noise power based on a channel response of a carrier transmitting a pilot signal. The OFDM reception apparatus of FIG. 9 comprises a tuner 12, an A/D conversion section 13, an AGC control section 214 (gain control section), a quadrature demodulation section 16, an FFT section 18, a demodulation section 20, a soft decision section 32, an error correction section 34, a source decoding section 36, and a noise power calculation section 70. In FIG. 9, the same components as those of FIG. 1 are indicated with the same reference numerals and will not be described in detail.

The AGC control section 214 receives a digitized IF OFDM signal from the A/D conversion section 13. The AGC control section 214 generates an AGC control signal for controlling a gain of the received signal, based on not only an average level of the received signal but also a noise power NP obtained in the noise power calculation section 70, so that an amplitude of the received signal goes to a predetermined level, and outputs the AGC control signal to the tuner 12.

The noise power calculation section 70 comprises a difference calculation section 52, a power calculation section 54, and an average calculation section 76. The difference calculation section 52 and the power calculation section 54 are similar to those which have been described with reference to FIG. 1. The noise power calculation section 70 detects a power of noise superposed on the received signal, based on a channel response $He(\omega p)$ with respect to a pilot carrier transmitting an SP signal.

The average calculation section 76 averages an interference power $IP(\omega p)$ with respect to a pilot carrier obtained in the power calculation section 54 in the frequency-axis direction or in both the frequency-axis direction and the time-axis direction, and outputs the result as a noise power NP superposed on the received OFDM signal. The interference power $IP(\omega p)$ with respect to the pilot carrier indicates interference superposed on the pilot signal, i.e., a noise power, as described in the first embodiment. The average calculation section 76 outputs the noise power NP to the AGC control section 214.

In the case where an OFDM signal on a certain channel is received, if a signal on another adjacent channel is mixed into the certain channel, a signal power of the desired channel decreases. In this case, the signal power of the OFDM signal is lowered relative to noise power, resulting in a deterioration in reception performance.

On the other hand, the tuner 12, when converting an RF signal into an IF signal, uses a BPF (Band Pass Filter) to perform band limitation so as to remove an unnecessary band signal.

Therefore, in order to prevent an unnecessary signal on an adjacent channel from being mixed into the demodulation section 20, a signal is passed through the BPF after reducing the gain of the RF signal, and the gain of a signal after conversion into the IF signal is increased, thereby making it possible to suppress the adjacent channel signal from being mixed into the OFDM demodulation section.

Therefore, for example, when the noise power NP has a large value, the AGC control section 214 outputs the AGC control signal so that the gain of the IF signal becomes larger than the gain of the RF signal in the tuner 12. When the noise power NP has a small value, the AGC control section 214 outputs the AGC control signal so that the gain of the IF signal becomes smaller than the gain of the RF signal in the tuner 12.

As described in the first embodiment, in the case where noise is superposed on the received signal, when a four-symbol difference in channel response $He(\omega p)$ with respect to a pilot carrier is obtained, the linear sum of noise vectors is obtained as a differential vector $\Delta He(\omega p)$ and the power is about two times larger than the noise power superposed on the transmission channel if a fluctuation over time in channel response is negligible. Therefore, by performing correction by multiplying the calculation result of the power calculation section 54 or the calculation result of the average calculation section 76 by ½, an approximate power of the noise interference can be appropriately detected.

Thus, according to the noise power calculation section 70, since the power of the four-symbol difference of an SP signal is used as a noise power, even if there is multipath interference, a noise power superposed on a received signal can be detected without an influence of the multipath interference.

With such a noise power detecting technique, when the gain of a tuner is controlled using a power of noise superposed on a received signal as a measure, a gain control can be performed soon after start of reception without an influence of multipath interference.

Figure 10:
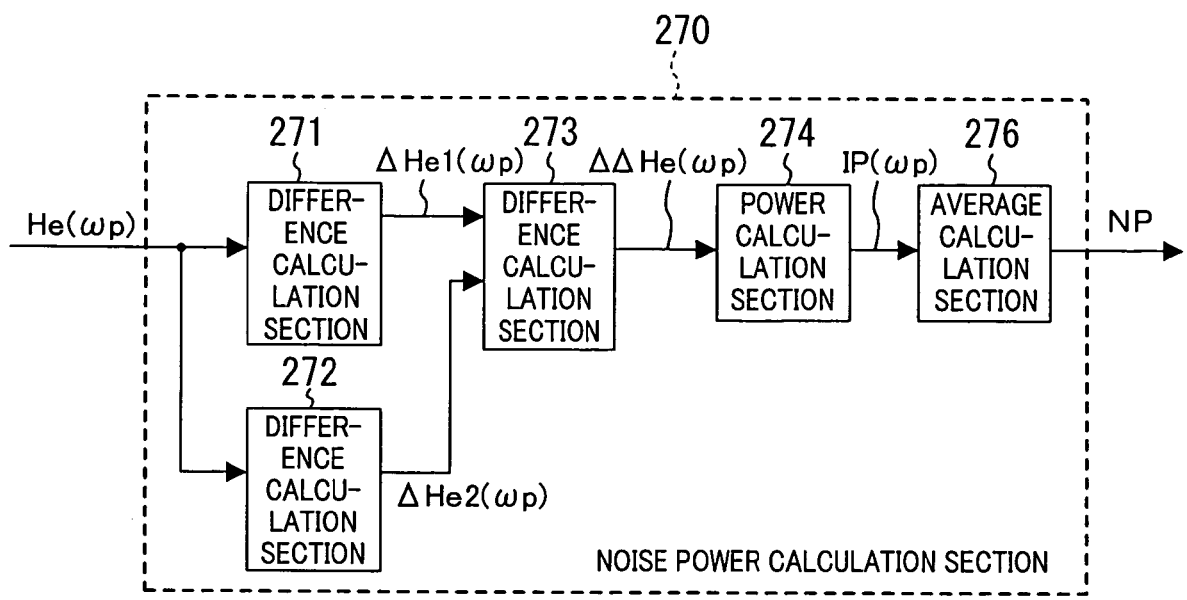
FIG. 10 is a block diagram illustrating a configuration of a variation of a noise power calculation section of FIG. 9.

FIG. 10 is a block diagram illustrating a configuration of a variation of the noise power calculation section 70 of FIG. 9. The noise power calculation section 270 of FIG. 10 comprises difference calculation sections 271, 272 and 273, a power calculation section 274, and an average calculation section 276.

The difference calculation section 271 receives the channel responses He($\omega$p) with respect to a pilot carrier obtained in the channel response calculation section 24, calculates a differential value $\Delta$He1($\omega$p) between a latest channel response and a channel response one cycle (4 symbols) before on the time axis with respect to the same pilot carrier, and outputs the differential value $\Delta$He1($\omega$p) to the difference calculation section 273.

The difference calculation section 272 receives the channel responses He($\omega$p) with respect to a pilot carrier obtained in the channel response calculation section 24, calculates a differential value $\Delta$He2($\omega$p) between a channel response four symbols before a latest channel response and a channel response one cycle before the channel response (i.e., a channel response eight symbols before the latest channel response) with respect to the same pilot carrier, and outputs the differential value $\Delta$He2($\omega$p) to the difference calculation section 273.

The difference calculation section 273 receives the differential value $\Delta$He1($\omega$p) and the differential value $\Delta$He2($\omega$p), calculates a differential value $\Delta\Delta$He($\omega$p) between $\Delta$He1($\omega$p) and $\Delta$He2($\omega$p), and outputs the differential value $\Delta\Delta$He($\omega$p) to the power calculation section 274.

The power calculation section 274 receives the differential value $\Delta\Delta$He($\omega$p) obtained in the difference calculation section 273, obtains the sum of the squares of the i-axis component and the q-axis component of the differential value $\Delta\Delta$He($\omega$p) (complex vector), and outputs the sum, as an interference power IP($\omega$p) with respect to a pilot carrier in which an SP signal is inserted, to the average calculation section 276.

The average calculation section 276 averages the interference power IP($\omega$p) with respect to the pilot carrier in the frequency-axis direction or in both the frequency-axis direction and the time-axis direction, and outputs the result, as a noise power NP superposed on the received OFDM signal, to the AGC control section 214.

As indicated in the first embodiment, $\Delta$He1($\omega$p, s) is obtained as a four-symbol difference in channel response, i.e., a difference between He($\omega$p, s) and He($\omega$p, s+4).

$$\Delta He1(\omega p, s) = H(\omega p, s+4) + I'(\omega p, s+4) - \{H(\omega p, s)\} \quad (7)$$

Similarly, $\Delta$He2($\omega$p, s) is obtained as a difference between He($\omega$p, s+8) and He($\omega$p, s+4).

$$\Delta He2(\omega p, s) = \quad (8)$$
$$H(\omega p, s+8) + I'(\omega p, s+8) - \{H(\omega p, s+4) + I'(\omega p, s+4)\}$$

The difference $\Delta\Delta$He($\omega$p, s) between $\Delta$He1($\omega$p, s) and $\Delta$He2($\omega$p, s) is obtained by:

$$\Delta\Delta He(\omega p, s) = \quad (9)$$
$$\{(H(\omega p, s+8) - H(\omega p, s+4)) - (H(\omega p, s+4) - H(\omega p, s))\} +$$
$$\{(I'(\omega p, s+8) - I'(\omega p, s+4)) - (I'(\omega p, s+4) - I'(\omega p, s))\}.$$

As can be seen from expression (9), even when channel responses fluctuate over time (e.g., when reception is performed during moving, etc.), the fluctuation may be uniform as indicated by:

$$H(\omega p, s+4) - H(\omega p, s) \approx H(\omega p, s+8) - H(\omega p, s+4).$$

In this case, $\Delta\Delta$He($\omega$p, s) is obtained by:

$$\Delta\Delta He(\omega p, s) \approx \quad (10)$$
$$(I'(\omega p, s+8) - I'(\omega p, s+4)) - (I'(\omega p, s+4) - I'(\omega p, s)).$$

As can be seen, only interference terms remain, so that the magnitude of $\Delta\Delta$He($\omega$p, s) has a high correlation with the magnitude of interference.

As can be seen from the above description, assuming that noise is superposed on a received signal and a fluctuation over time in channel response is negligible, when the differential vector $\Delta\Delta$He($\omega$p, s) between the differential vector $\Delta$He1($\omega$p, s) and the differential vector $\Delta$He2($\omega$p, s) is obtained, only the linear sum of interference vectors is obtained. The differential vector $\Delta\Delta$He($\omega$p, s) has a power about four times larger than the noise power superposed on the received signal. Therefore, if correction is performed by multiplying the calculation result of the power calculation section 274 or the calculation result of the average calculation section 276 by ¼, an approximate power of noise interference can be appropriately detected.

Also, according to the noise power calculation section 270 of FIG. 10, even in the case where channel responses fluctuate over time, if the fluctuation can be assumed to be uniform, the noise power detection precision can be improved as compared to that of the configuration of FIG. 9.

Note that, when the average calculation section 76 or 276 calculates an average value of the output of the power calculation section 54 or 274 by averaging in the frequency-axis direction, the detection result of noise power can be obtained soon after start of a reception operation. In addition, when the average calculation section 76 or 276 calculates an average value of the output of the power calculation section 54 or 274 by averaging in the time-axis direction as well as in the frequency-axis direction, the detection result of noise power can be obtained with high precision as compared to when the average is calculated only in the frequency-axis direction. Therefore, an optimal average value calculation method may be selected, depending on the situation.

Figure 11:
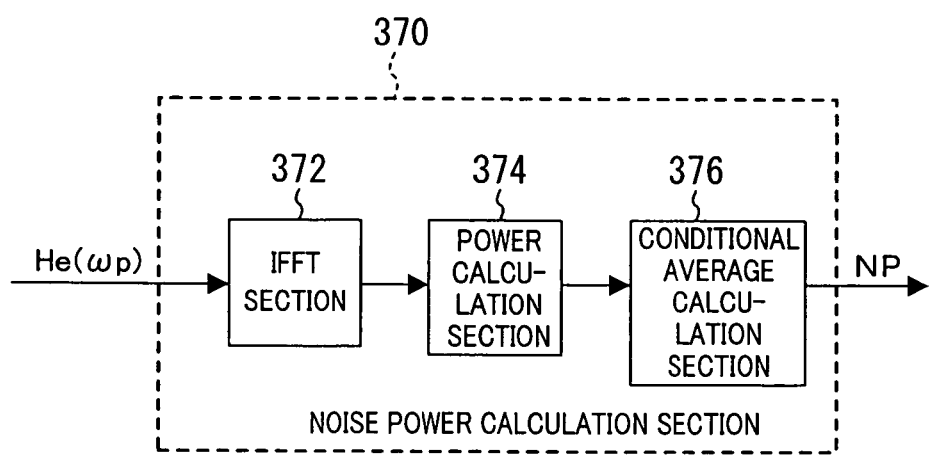
FIG. 11 is a block diagram illustrating a configuration of another variation of the noise power calculation section of FIG. 9.

FIG. 11 is a block diagram illustrating a configuration of another variation of the noise power calculation section 70 of FIG. 9. The noise power calculation section 370 of FIG. 11 comprises an IFFT section 372, a power calculation section 374, and a conditional average calculation section 376.

In FIG. 11, the IFFT section 372 performs inverse Fourier transform (IFFT) on a channel response He($\omega$p) with respect to a pilot carrier for each symbol to obtain an impulse response (time-domain signal), and outputs the impulse response to the power calculation section 374. Note that the impulse response is also a complex signal. The power calculation section 374 calculates the sum of the squares of the i-axis component and the q-axis component of the input impulse response as a power of the impulse response, and outputs the power of the impulse response to the conditional average calculation section 376.

Figure 12:
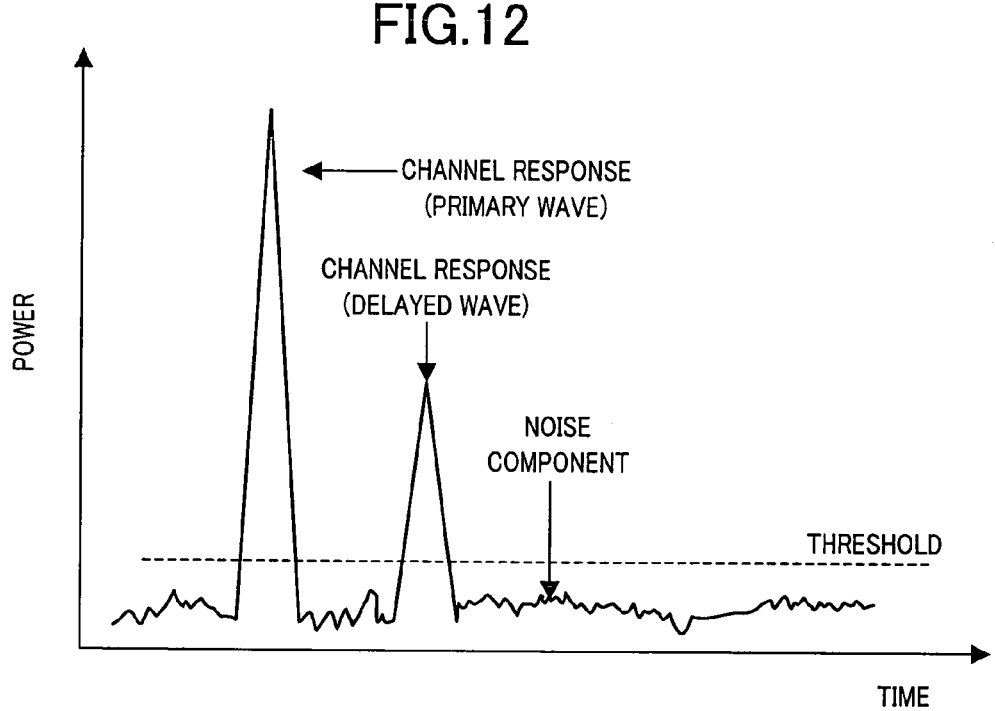
FIG. 12 is a graph illustrating a power of an impulse response on a transmission channel obtained in a power calculation section 374 of FIG. 11.

FIG. 12 is a graph illustrating the power of the impulse response on a transmission channel obtained in the power calculation section 374 of FIG. 11. FIG. 12 illustrates an impulse response in the case where there are multipath interference and noise interference on the transmission channel. As illustrated in FIG. 12, the impulse response on the transmission channel has peaks indicating a primary wave and a delayed wave, the primary wave and the delayed wave each have a locally concentrated power, and noise components are distributed at substantially a constant level in a floor portion irrespective of time.

The conditional average calculation section 376 assumes power values lower than or equal to a predetermined threshold value as illustrated in FIG. 12 to be noise, averages these power values over predetermined symbols, and outputs the resultant average value as a noise power NP. The threshold value may be either a fixed value or a value having a predetermined ratio with respect to the peak value indicating the primary wave which is an OFDM signal component. Note that the threshold value is set to be substantially smaller than the levels of the primary wave and the delayed wave of a received OFDM signal.

Before performing IFFT, the channel response He($\omega$p) may be multiplied by an appropriate window function on the frequency axis. In this case, the waveform of the OFDM signal component has a steep rise and fall, thereby making it possible to improve the noise power detection precision.

Thus, the noise power calculation section 370 of FIG. 11 performs IFFT on a channel response He($\omega$p) with respect to a pilot carrier, the channel response He($\omega$p) being obtained from a received signal on which noise is superposed, to obtain an impulse response for each symbol, and detects a noise power based on components having values lower than or equal to the predetermined threshold value. Therefore, there is a less influence of a fluctuation over time in channel response, so that the noise power detection precision can be improved as compared to the noise power calculation section 70 of FIG. 9.

Figure 13:
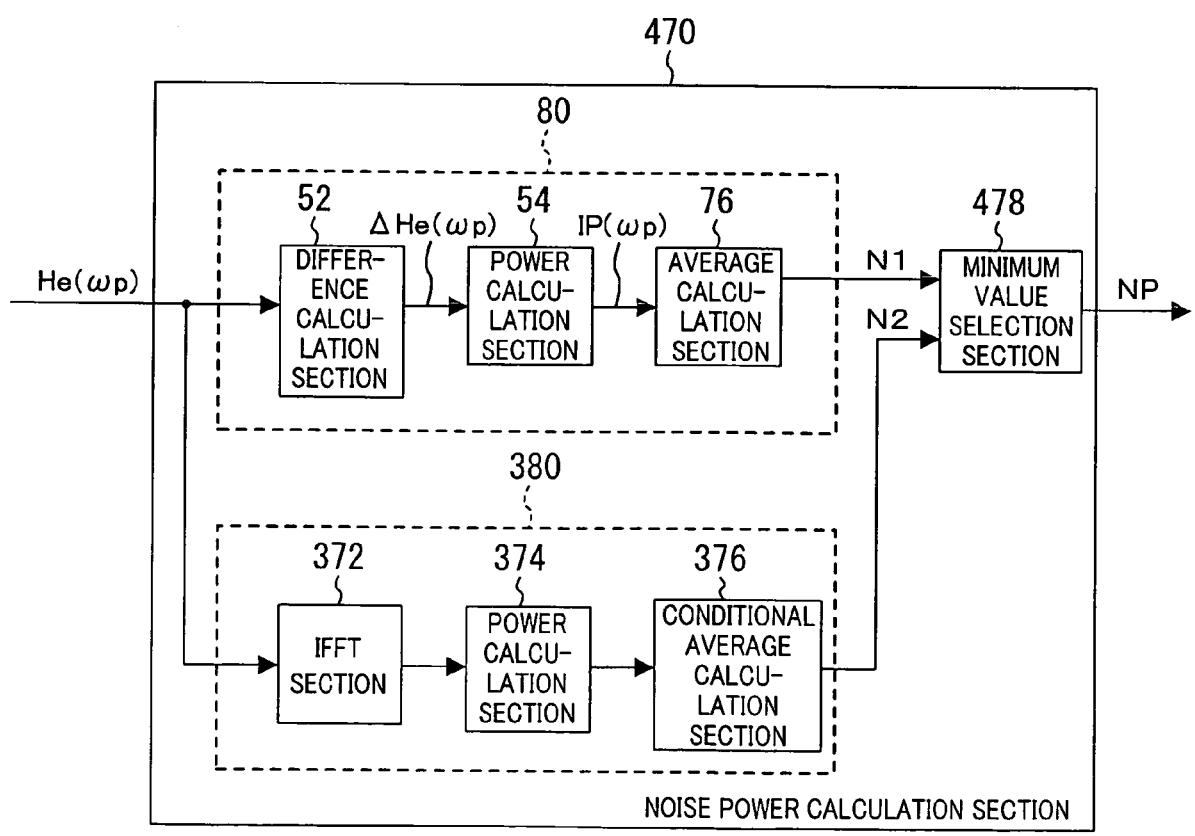
FIG. 13 is a block diagram illustrating a configuration of still another variation of the noise power calculation section of FIG. 9.

FIG. 13 is a block diagram illustrating a configuration of still another variation of the noise power calculation section 70 of FIG. 9. The noise power calculation section 470 of FIG. 13 comprises noise power candidate calculation sections 80 and 380, and a minimum value selection section 478. The noise power candidate calculation sections 80 and 380 have configurations similar to that of the noise power calculation section 70 of FIG. 9 and that of the noise power calculation section 370 of FIG. 11, respectively.

The noise power candidate calculation section 80 obtains a noise power N1 based on a four-symbol difference in channel response He($\omega$p) with respect to a pilot carrier, and outputs the noise power N1 to the minimum value selection section 478. The noise power candidate calculation section 380 obtains a noise power N2 based on an impulse response of the channel response He($\omega$p) with respect to the pilot carrier, and outputs the noise power N2 to the minimum value selection section 478. The minimum value selection section 478 selects and outputs the smaller of the noise powers N1 and N2, as a noise power NP.

The noise power candidate calculation section 80 tries to detect a noise power based on a power of difference in channel response. Under an environment in which channel responses fluctuate over time (e.g., when reception is performed during moving, etc.), the result of difference calculation includes a fluctuation in channel response in addition to a noise component, and therefore, there is a possibility that the noise power N1 thus calculated has a value which is larger than an actual noise power of the transmission channel.

On the other hand, the noise power candidate calculation section 380 tries to detect a noise power based on a power of an impulse response on a transmission channel. When there is a plurality of delayed waves having a power smaller than that of a primary wave, the delayed wave components having a small power may be determined to be noise, depending on the threshold value for distinguishing an OFDM signal from noise, and the calculated noise power N2 has a value larger than that of an actual noise power of the transmission channel.

Thus, the values of the noise powers N1 and N2 calculated by the noise power candidate calculation sections 80 and 380, respectively, may be larger than an actual noise power value, depending on conditions of a transmission channel. Nevertheless, since the noise powers N1 and N2 are obtained in different ways, an error with respect to the actual noise power value can be reduced to the extent possible by selecting the smaller of the noise powers N1 and N2. Therefore, according to the noise power calculation section 470 of FIG. 13, it is possible to improve the noise power detection precision with a less influence of a fluctuation over time in channel response as compared to the noise power calculation section 70 of FIG. 9.

Note that, in the noise power calculation section 370 of FIG. 11 and the noise power calculation section 470 of FIG. 13, before IFFT is performed on a channel response He($\omega$p) with respect to a pilot carrier to obtain an impulse response for each symbol, time-axis direction interpolation may be performed (i.e., a channel response is obtained every three carriers on the frequency axis), and thereafter, an impulse response may be obtained for each symbol by IFFT. In this case, an influence of aliasing on an impulse response can be reduced.

In the noise power calculation sections 370 and 470, before IFFT is performed on a channel response He($\omega$p) with respect to a pilot carrier to obtain an impulse response for each symbol (after time-axis direction interpolation if it is performed), the channel response may be multiplied by an appropriate window function on the frequency axis, and thereafter, an impulse response may be obtained for each symbol by IFFT. In this case, the waveform of the OFDM signal component has a steep rise and fall, thereby making it possible to improve the noise power detection precision.

Third Embodiment

When a received OFDM signal is subjected to demodulation and error correction, the reliability of each demodulated carrier may be estimated and the resultant information may be used to perform soft decision (demapping) with respect to the demodulated signal. When frequency selective interference, such as multipath interference and specific-carrier interference or the like, occurs on a transmission channel, the position of a carrier affected by the interference and the degree of an influence of the interference are approximately detected as the reliability of the carrier, and based on the information, soft decision is performed with respect to the demodulated signal, thereby significantly improving error correction capability under an interference environment.

In this embodiment, an OFDM reception apparatus having a simple circuit configuration will be described in which the reliability of each carrier is obtained as a carrier quality value described below and the resultant value is used to perform soft decision even under various interference conditions, such as noise interference, multipath, frequency selective interference with a specific carrier, interference occurring during moving, and the like.

Figure 14:
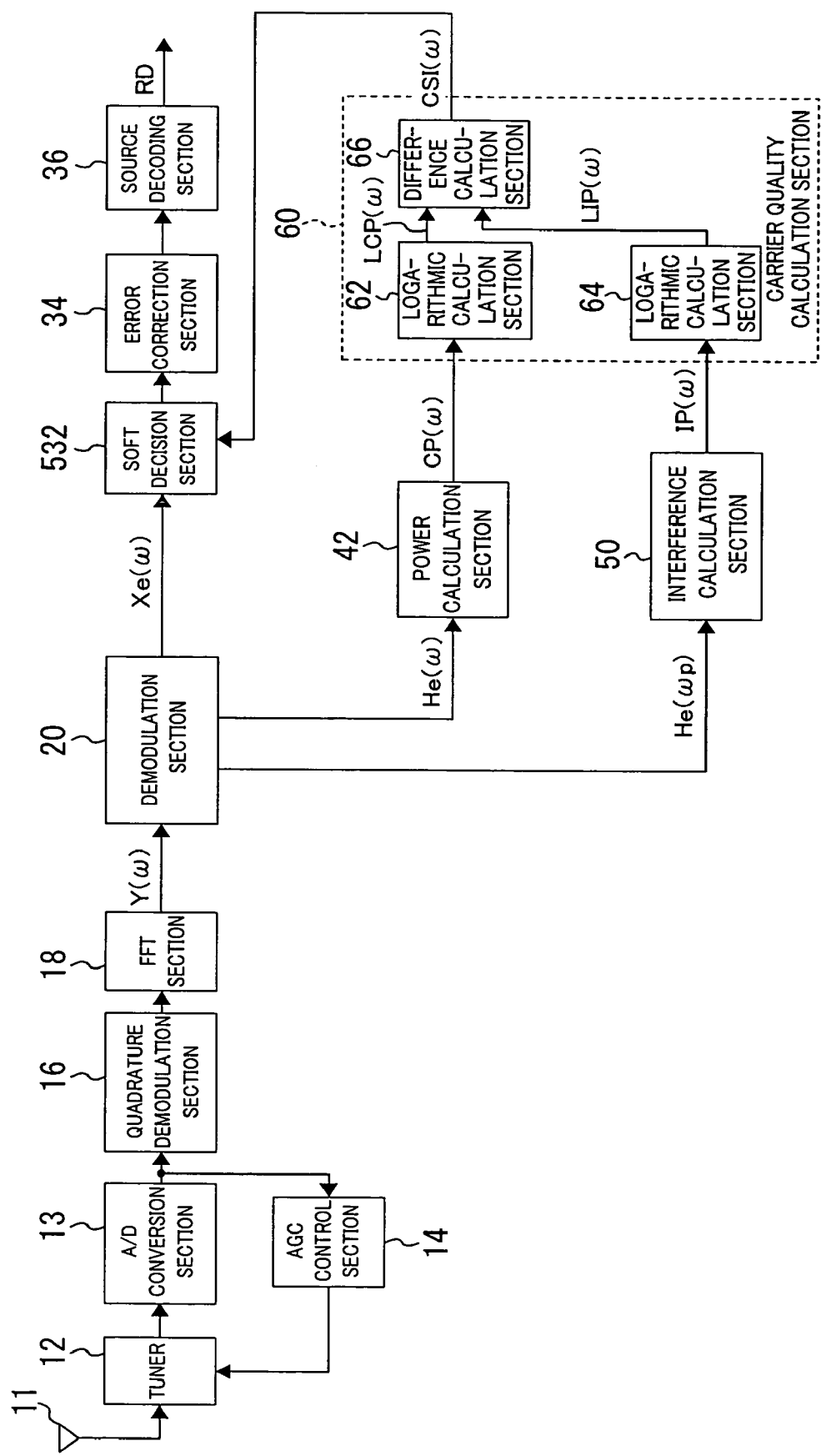
FIG. 14 is a block diagram illustrating an exemplary configuration of an OFDM reception apparatus according to a third embodiment of the present invention.

FIG. 14 is a block diagram illustrating an exemplary configuration of an OFDM reception apparatus according to a third embodiment of the present invention. The OFDM reception apparatus of FIG. 14 is different from the OFDM reception apparatus of FIG. 1 in that the OFDM reception apparatus of FIG. 14 comprises a soft decision section 532 instead of the soft decision section 32, and does not comprise the average calculation section 44.

The OFDM reception apparatus thus configured of FIG. 14 calculates a carrier power $CP(\omega)$ for each carrier from a received OFDM signal, calculates an interference power $IP(\omega)$ by converting the degree of an influence of interference for each carrier, and obtains a carrier quality value $CSI(\omega)$ from a difference between logarithmic values thereof. For example, when $CSI(\omega)=LCP(\omega)-LIP(\omega)$, the larger the value of the carrier quality value $CSI(\omega)$, the lower the influence of the interference, i.e., the higher the reliability of a carrier.

The carrier quality calculation section 60 of FIG. 14 calculates the logarithmic values of the carrier power $CP(\omega)$ and the interference power $IP(\omega)$ as $LCP(\omega)$ and $LIP(\omega)$, obtains a differential value between $LCP(\omega)$ and $LIP(\omega)$, and outputs the calculation result as a carrier quality value $CSI(\omega)$ to the soft decision section 532.

Here, each signal in the carrier quality calculation section 60 under various interference environments will be described.

FIGS. 15(a) and 15(b) are diagrams illustrating frequency characteristics of the carrier powers $CP(\omega)$ and $LCP(\omega)$, respectively, when there is multipath interference. As illustrated in FIG. 15(a), there are drops of the carrier power $CP(\omega)$ in the vicinity of frequencies $\omega a$, $\omega b$ and $\omega c$ due to the multipath interference, and the drops have different magnitudes. In this case, as illustrated in FIG. 15(b), regarding the magnitudes (logarithmic values) of the drops of the carrier power $LCP(\omega)$, whereas the largest drop at the vicinity of the frequency $\omega b$ is clearer compared to FIG. 15(a), the smaller drops at the vicinity of the frequencies $\omega a$ and $\omega c$ are unclear compared to FIG. 15(a).

Specifically, when drops having different magnitudes occur in the power of each carrier due to multipath interference, the carrier power $LCP(\omega)$ (logarithmic value) can be used to more correctly estimate an influence of the interference on a carrier having a relatively large magnitude of drop which is a dominant factor for a deterioration in reception performance, as compared to the carrier power $CP(\omega)$.

FIGS. 16(a) and 16(b) are diagrams illustrating frequency characteristics of the interference powers $IP(\omega)$ and $LIP(\omega)$, respectively, when there is analog co-channel interference. As illustrated in FIG. 16(a), it is assumed that there are peaks of the interference power $IP(\omega)$ in the vicinity of frequencies $\omega a$, $\omega b$ and $\omega c$ due to the analog co-channel interference. In this case, as illustrated in FIG. 16(b), the interference power $LIP(\omega)$ (logarithmic value) clarifies the presence of small peaks which are difficult to recognize in FIG. 16(a), so that differences between these small peaks and the peaks in the vicinity of the frequencies $\omega a$, $\omega b$ and $\omega c$, which seem to be large in FIG. 16(a), seem to be reduced.

Specifically, when peaks having different magnitudes occur in the interference power of each carrier due to analog co-channel interference or the like, the interference power $LIP(\omega)$ (logarithmic value) can be used to more correctly estimate an influence of the interference on a carrier having a relatively small interference power, as compared to the interference power $IP(\omega)$.

The difference calculation section 66 obtains a differential value between the carrier power $LCP(\omega)$ and the interference power $LIP(\omega)$ and outputs the differential value as a carrier quality value $CSI(\omega)$. Therefore, when there is multipath interference, a quality value of a carrier particularly significantly affected by the interference can be more clearly calculated. Also, when there is specific-carrier interference, such as analog co-channel interference or the like, a quality value of a carrier affected by the interference can be more clearly calculated.

The soft decision section 532 performs soft decision with respect to the demodulated signal $Xe(\omega)$ output from the demodulation section 20, for each carrier, based on the carrier quality value $CSI(\omega)$ obtained from the carrier quality calculation section 60, to calculate soft decision metric data, and outputs the soft decision metric data to the error correction section 34.

For example, the soft decision section 532 calculates a value (likelihood) indicating a most "zeroness" or "oneness", as the soft decision metric data, with respect to a carrier having considerably high reliability, and conversely, calculates a value indicating an intermediate value between "0" and "1", as the soft decision metric data, with respect to a carrier having considerably low reliability, and for other carriers, calculates a value, depending on a distance between a received signal point and an ideal signal point, and a value of the carrier quality value $CSI(\omega)$. Thus, the OFDM reception apparatus of FIG. 14 lowers the likelihood of "zeroness" and "oneness" of the metric data for a carrier affected by frequency selective interference, to reduce contribution to error correction, thereby making it possible to improve an effect of error correction with respect to the whole received signal.

Figure 17:
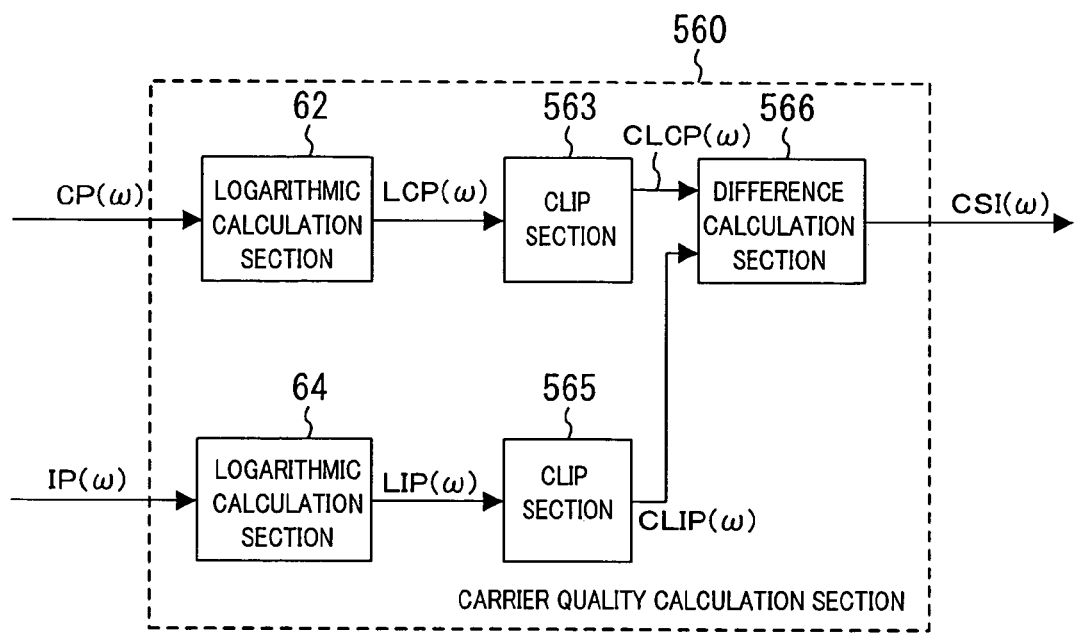
FIG. 17 is a block diagram illustrating a configuration of a variation of a carrier quality calculation section of FIG. 14.

FIG. 17 is a block diagram illustrating a configuration of a variation of the carrier quality calculation section 60 of FIG. 14. The carrier quality calculation section 560 of FIG. 17 has logarithmic calculation sections 62 and 64, clip sections 563 and 565, and a difference calculation section 566. The logarithmic calculation sections 62 and 64 calculate the logarithmic values of the carrier power $CP(\omega)$ and the interference power $IP(\omega)$ as $LCP(\omega)$ and $LIP(\omega)$, respectively, and outputs the logarithmic values to the clip sections 563 and 565.

The clip section 563 subtracts a predetermined clip value from the carrier power $LCP(\omega)$ (logarithmic value), and outputs 0 when the subtraction result is positive, and outputs the subtraction result when the subtraction result is negative (clip process), and outputs the clipped carrier power $CLCP(\omega)$ to the difference calculation section 566. The clip section 565 subtracts a predetermined clip value from the interference power $LIP(\omega)$ (logarithmic value), and outputs 0 when the subtraction result is negative, and outputs the subtraction result when the subtraction result is positive (clip process), and outputs the clipped interference power $CLIP(\omega)$ to the difference calculation section 566. The difference calculation section 566 obtains a differential value between the output of the clip section 563 and the output of the clip section 565, and outputs the calculation result as a carrier quality value $CSI(\omega)$ to the soft decision section 532.

Here, each signal in the carrier quality calculation section 560 under various interference environments will be described.

FIG. 15(c) is a diagram illustrating frequency characteristics of the clipped carrier power $CLCP(\omega)$ when there is multipath interference. The clip section 563 clips the carrier power $LCP(\omega)$ of FIG. 15(b), where the clip value is THC. As illustrated in FIG. 15(c), a state of the resultant carrier power $CLCP(\omega)$ in the vicinity of the frequency $\omega b$ where there is a largest drop is more clearly indicated than in FIG. 15(b), and other drops are substantially not indicated.

Specifically, when drops having different magnitudes occur in carrier power due to multipath interference, the clipped carrier power CLCP(ω) can be used to more correctly estimate an influence of interference with respect to a carrier having a large drop which is a dominant factor for a deterioration in reception performance, as compared to the carrier power CP(ω) or LCP(ω).

FIG. 16(c) is a diagram illustrating frequency characteristics of the clipped interference power CLIP(ω) when there is analog co-channel interference. The clip section 565 clips the interference power LIP(ω) of FIG. 16(b), where the clip value is THI. As illustrated in FIG. 16(c), in the resultant interference power CLIP(ω), only peaks having levels larger than or equal to a predetermined level can be recognized, and other peaks are substantially not indicated.

Specifically, when peaks having different magnitudes occur in interference power due to analog co-channel interference, the clipped interference power CLIP(ω) can be used to more correctly estimate an influence of interference with respect to a carrier having a relatively large interference power larger than or equal to the predetermined level, which is a more dominant factor for a deterioration in reception performance than a carrier having a considerably small interference power which has a less influence on reception performance, as compared to the carrier power CI(ω) or LCI(ω).

The difference calculation section 566 calculates a differential value (CLCP(ω)–CLIP(ω)) between the clipped carrier power CLCP(ω) and the interference power CLIP(ω), and outputs the differential value as a carrier quality value CSI(ω). Therefore, when there is multipath interference, the quality value of a carrier particularly significantly affected by the interference can be more appropriately calculated. When there is specific-carrier interference (e.g., analog co-channel interference, etc.) or the like, the quality value of a carrier affected by the interference can be more appropriately calculated.

Figure 18:
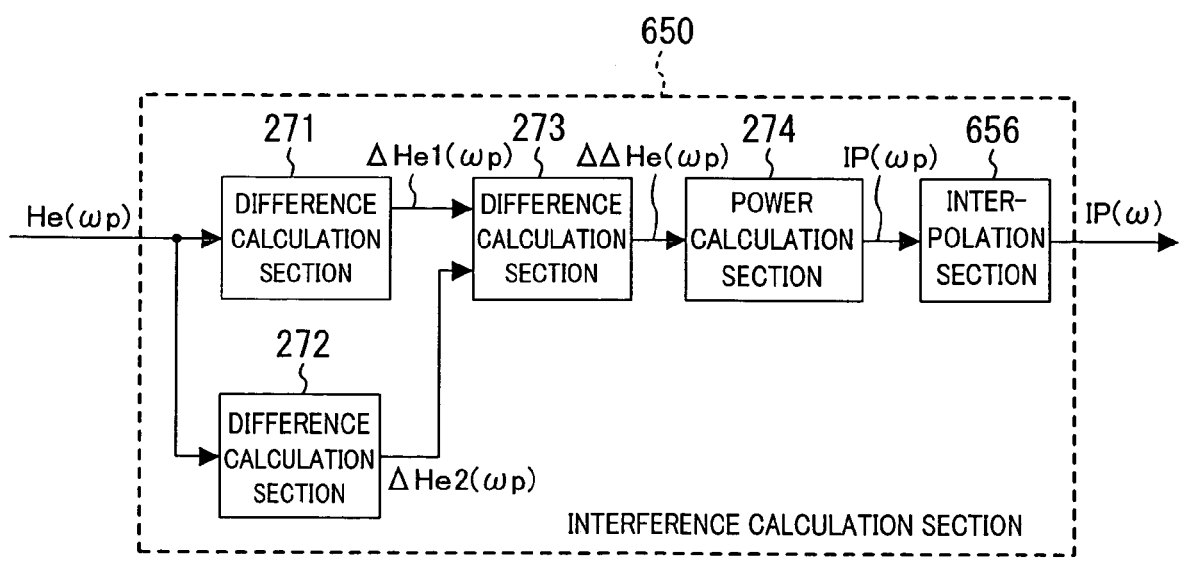
FIG. 18 is a block diagram illustrating a configuration of a variation of the interference calculation section of FIG. 14.

FIG. 18 is a block diagram illustrating a configuration of a variation of the interference calculation section 50 of FIG. 14. The interference calculation section 650 of FIG. 18 comprises difference calculation sections 271, 272 and 273, a power calculation section 274, and an interpolation section 656. The difference calculation sections 271 to 273 and the power calculation section 274 are similar to those described with reference to FIG. 10 and will not be described. The interpolation section 656 interpolates interference power IP(ωp) with respect to a pilot carrier obtained in the power calculation section 274 in the time-axis direction and the frequency-axis direction to obtain an interference power IP(ω), and outputs the interference power IP(ω).

According to the interference calculation section 650, even in the case where channel responses fluctuate over time, if the fluctuation can be assumed to be uniform, the detection precision of the interference power IP(ω) is improved as compared to the configuration of FIG. 14.

Figure 19:
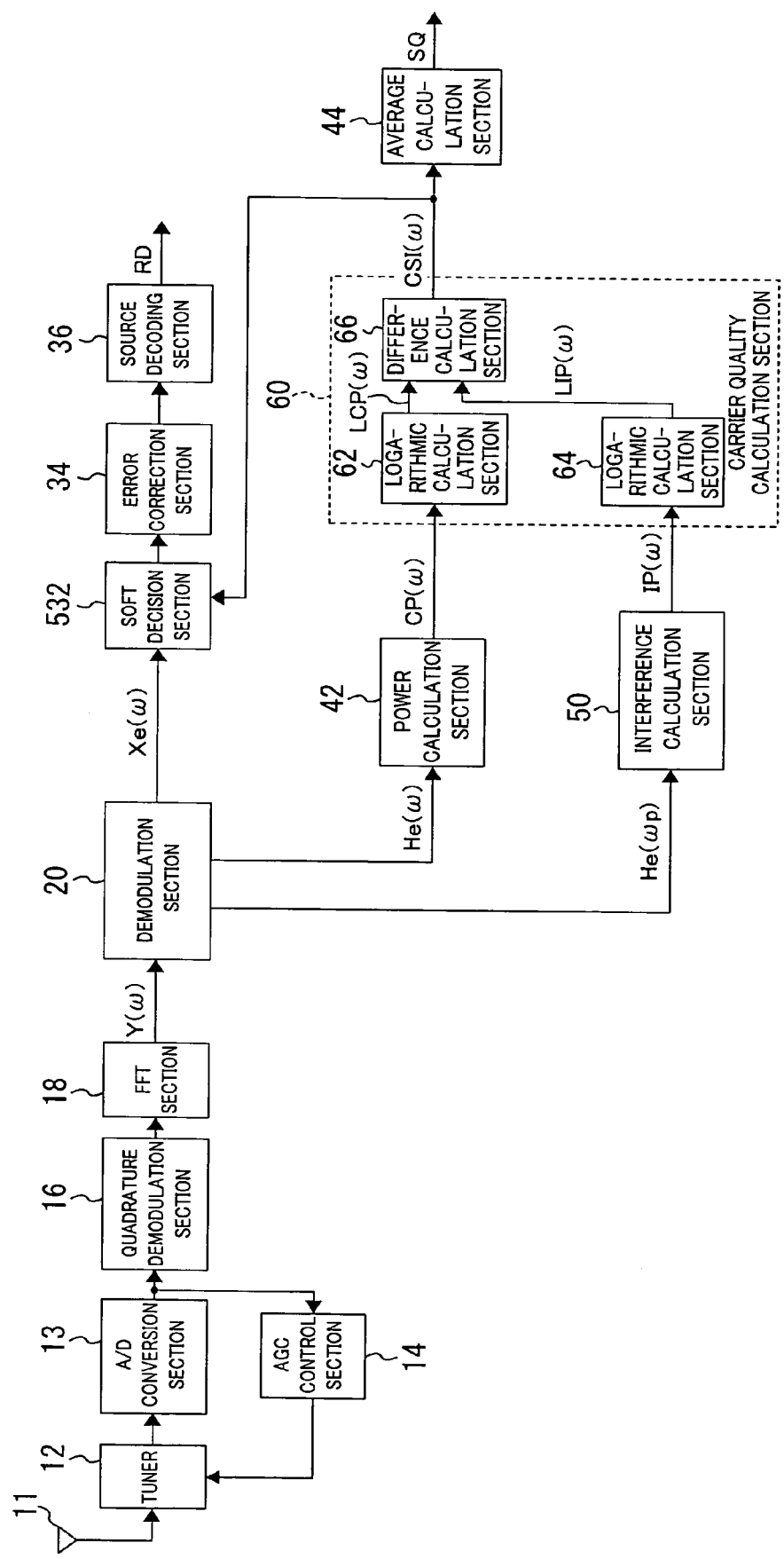
FIG. 19 is a block diagram illustrating a configuration of a variation of the OFDM reception apparatus of the third embodiment of the present invention.

FIG. 19 is a block diagram illustrating a configuration of a variation of the OFDM reception apparatus of the third embodiment of the present invention. The OFDM reception apparatus of FIG. 19 is different from the OFDM reception apparatus of FIG. 14 in that the OFDM reception apparatus of FIG. 19 further comprises the average calculation section 44 of FIG. 1.

In the OFDM reception apparatus of FIG. 19, the average calculation section 44 uses the carrier quality value CSI(ω) obtained for soft decision, so that neither of the interference calculation section 50 and the carrier quality calculation section 60 is further required for obtaining the received signal quality value SQ. Therefore, when the received signal quality value SQ is to be obtained, in addition to performing soft decision in view of the degree of an influence of interference, an increase in circuit scale can be prevented.

Figure 20:
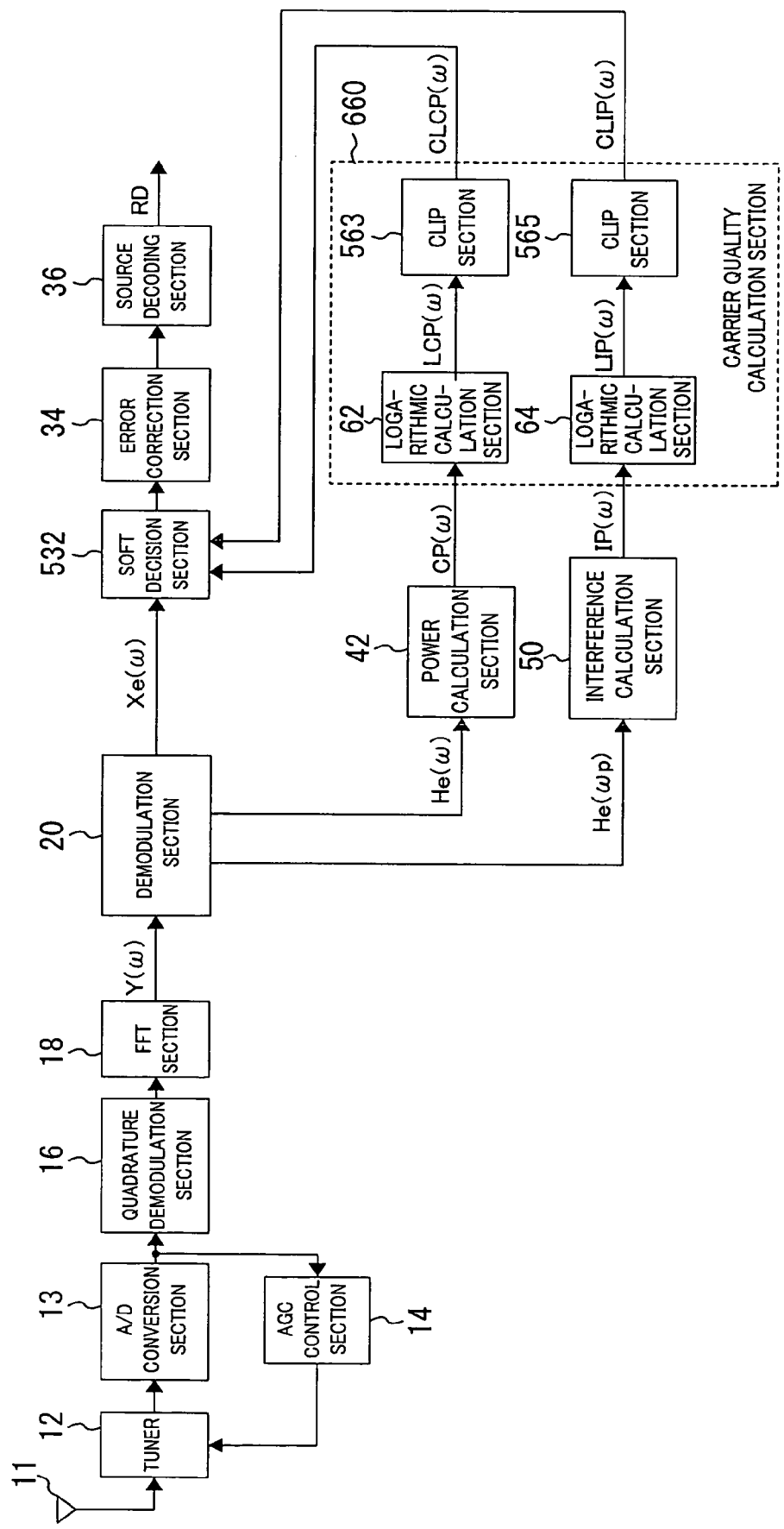
FIG. 20 is a block diagram illustrating a configuration of another variation of the OFDM reception apparatus of the third embodiment of the present invention.

FIG. 20 is a block diagram illustrating a configuration of another variation of the OFDM reception apparatus of the third embodiment of the present invention. The OFDM reception apparatus of FIG. 20 is different from the OFDM reception apparatus of FIG. 14 in that the OFDM reception apparatus of FIG. 20 comprises a carrier quality calculation section 660 and a soft decision section 632 instead of the carrier quality calculation section 60 and the soft decision section 532, respectively.

The carrier quality calculation section 660 of FIG. 20 is different from the carrier quality calculation section 560 of FIG. 17 in that the difference calculation section 565 is removed from the carrier quality calculation section 560. The carrier quality calculation section 660 outputs the clipped carrier power CLCP(ω) and the clipped interference power CLCP(ω) which are obtained from the clip sections 563 and 565, respectively, to the soft decision section 632.

The soft decision section 632 performs soft decision with respect to the demodulated signal Xe(ω) output from the demodulation section 20 for each carrier, based on both or either of the clipped carrier power CLCP(ω) and the clipped interference power CLCP(ω), to calculate soft decision metric data, and outputs the soft decision metric data to the error correction section 34.

According to the OFDM reception apparatus of FIG. 20, the carrier quality calculation section 660 outputs the carrier power CLCP(ω) and the interference power CLIP(ω) separately, and the soft decision section 632 tries to perform soft decision using both or either of the carrier power CLCP(ω) and the interference power CLIP(ω). In this case, in the soft decision section 632, a likelihood can be calculated while assigning different weights to the carrier power CLCP(ω) and the interference power CLIP(ω). Thus, a more flexible soft decision process can be achieved, thereby making it possible to improve error correction capability.

As described above, the OFDM reception apparatus of this embodiment performs soft decision with respect to each carrier of a received OFDM signal from a carrier power and an interference power indicating the degree of an influence of interference, based on a quality value obtained for each carrier. Therefore, the degree of an influence of interference on each carrier can be estimated with high precision, and the information can be used to perform effective soft decision, thereby making it possible to improve demodulation and error correction capabilities.

Note that the OFDM reception apparatus of FIG. 14 may comprise the interference calculation section 150 of FIG. 8 instead of the interference calculation section 50.

Note that the OFDM reception apparatus of FIG. 1 may comprise the interference calculation section 650 of FIG. 18 instead of the interference calculation section 50.

INDUSTRIAL APPLICABILITY

As described above, according to the present invention, a simple circuit configuration can be used to detect a signal quality value of a received signal on which an influence of interference on an OFDM signal is reflected, and a value of a noise power with high precision even under various interference conditions. Also, the reliability of each carrier can be appropriately calculated, thereby making it possible to improve demodulation and error correction capabilities. Therefore, the present invention is useful for an OFDM reception apparatus and the like.

The invention claimed is:

1. An OFDM reception apparatus for receiving and demodulating an OFDM (Orthogonal Frequency Division Multiplexing) signal composed of a plurality of carriers including a carrier transmitting a pilot signal which is inserted at predetermined symbol intervals, comprising:
 a fast Fourier transform section for converting a received OFDM signal into a frequency-domain OFDM signal and outputting the frequency-domain OFDM signal;
 a channel response calculation section for obtaining a channel response with respect to the carrier transmitting the pilot signal, from the frequency-domain OFDM signal;
 an interpolation section for interpolating the channel response with respect to the carrier transmitting the pilot signal, and outputting the result;
 a power calculation section for calculating the square of a magnitude of the interpolated channel response obtained in the interpolation section, as a carrier power, for each carrier corresponding to the channel response;
 an interference calculation section for calculating a degree of an influence of interference on the received OFDM signal, as an interference power, for each carrier corresponding to the interpolated channel response; and
 a carrier quality calculation section for calculating a ratio of the carrier power obtained in the power calculation section to the interference power corresponding thereto obtained in the interference calculation section, for each carrier.

2. The OFDM reception apparatus of claim 1, wherein
 the carrier quality calculation section converts the carrier power obtained in the power calculation section into a first logarithmic value, converts the interference power obtained in the interference calculation section into a second logarithmic value, calculates a differential value between the first logarithmic value and the second logarithmic value, and outputs the obtained differential value as a ratio of the carrier power obtained in the power calculation section to the interference power obtained in the interference calculation section.

3. The OFDM reception apparatus of claim 1, further comprising:
 an average calculation section for averaging the ratio obtained in the carrier quality calculation section over a plurality of carriers, and outputting the result as a signal quality value of the received OFDM signal.

4. The OFDM reception apparatus of claim 1, wherein
for the carrier transmitting the pilot signal, the interference calculation section calculates a differential Value between channel responses with respect to pilot signals adjacent via the predetermined symbol interval, obtains the square of a magnitude of each differential value, performs interpolation in a time-axis direction or both in the time-axis direction and a frequency-axis direction, and outputs the result as the interference power.

5. The OFDM reception apparatus of claim 1, wherein
the interference calculation section performs hard decision with respect to a demodulated signal obtained by equalizing the frequency-domain OFDM signal, obtains a value corresponding to a distance between a signal point of the demodulated signal and a reference signal point obtained by performing hard decision with respect to the signal point, performs integration in a time-axis direction for each carrier, and outputs the result as the interference power.

6. The OFDM reception apparatus of claim 1, wherein
for the carrier transmitting the pilot signal, the interference calculation section calculates a first differential value between a channel response with respect to a first pilot signal and a channel response with respect to a second pilot signal transmitted the predetermined symbol interval after the first pilot signal, calculates a second differential value between the channel response with respect to the second pilot signal and a channel response with respect to a third pilot signal transmitted the predetermined symbol interval after the second pilot signal, calculates a third differential value between the first differential value and the second differential value, obtains the square of a magnitude of the third differential value, performs interpolation in a time-axis direction or both in the time-axis direction and a frequency-axis direction, and outputs the result as the interference power.

7. The OFDM reception apparatus of claim 1, further comprising:
 a soft decision section for performing soft decision with respect to a demodulated signal obtained by equalizing the frequency-domain OFDM signal, based on the output of the carrier quality calculation section.

8. The OFDM reception apparatus of claim 7, wherein
the carrier quality calculation section converts the carrier power obtained in the power calculation section into a first logarithmic value, converts the interference power obtained in the interference calculation section into a second logarithmic value, obtains a differential value between the first logarithmic value and the second logarithmic value, and outputs the obtained differential Value as a ratio of the carrier power obtained in the power calculation section to the interference power obtained in the interference calculation section.

9. The OFDM reception apparatus of claim 7, wherein
the carrier quality calculation section converts the carrier power obtained in the power calculation section into a first logarithmic value, clips the first logarithmic value using a first predetermined value to calculate a first clipped logarithmic value, converts the interference power obtained in the interference calculation section into a second logarithmic value, clips the second logarithmic value using a second predetermined value to calculate a second clipped logarithmic value, obtains a differential value between the first clipped logarithmic value and the second clipped logarithmic value, and outputs the obtained differential value as a ratio of the carrier power obtained in the power calculation section to the interference power obtained in the interference calculation section.

10. The OFDM reception apparatus of claim 7, wherein
the carrier quality calculation section converts the carrier power obtained in the power calculation section into a first logarithmic value, clips the first logarithmic value using a first predetermined value to calculate a first clipped logarithmic value, converts the interference power obtained in the interference calculation section into a second logarithmic value, and clips the second logarithmic value using a second predetermined value to calculate a second clipped logarithmic value, and
the soft decision section performs soft decision with respect to a demodulated signal obtained by equalizing the frequency-domain OFDM signal, based on at least one of the first and second clipped logarithmic values.

11. An OFDM reception method for receiving and demodulating an OFDM signal composed of a plurality of carriers including a carrier transmitting a pilot signal which is inserted at predetermined symbol intervals, comprising:

- a fast Fourier transform step of converting a received OFDM signal into a frequency-domain OFDM signal;
- a channel response calculation step of obtaining a channel response with respect to the carrier transmitting the pilot signal, from the frequency-domain OFDM signal;
- an interpolation step of interpolating the channel response with respect to the carrier transmitting the pilot signal;
- a power calculation step of calculating the square of a magnitude of the interpolated channel response obtained in the interpolation step, as a carrier power, for each carrier corresponding to the channel response;
- an interference calculation step of calculating a degree of an influence of interference on the received OFDM signal, as an interference power, for each carrier corresponding to the interpolated channel response; and
- a carrier quality calculation step of calculating a ratio of the carrier power obtained in the power calculation step to the interference power corresponding thereto obtained in the interference calculation step, for each carrier.

* * * * *